(12) United States Patent
Ferreri et al.

(10) Patent No.: US 10,668,863 B2
(45) Date of Patent: Jun. 2, 2020

(54) HOLDING ARRANGEMENT AND PROTECTIVE COVER

(71) Applicant: Doorbrella Pty Ltd, Wetherill Park (AU)

(72) Inventors: Domenico Ferreri, Abbotsbury (AU); Francesco Mittiga, Mt Vernom (AU)

(73) Assignee: DOORBRELLA PTY LTD, Wetherill Park (AU)

( * ) Notice: Subject to any disclaimer, the term of this patent is extended or adjusted under 35 U.S.C. 154(b) by 0 days.

(21) Appl. No.: 15/577,766

(22) PCT Filed: May 27, 2016

(86) PCT No.: PCT/AU2016/000185
§ 371 (c)(1),
(2) Date: Nov. 28, 2017

(87) PCT Pub. No.: WO2016/191796
PCT Pub. Date: Dec. 8, 2016

(65) Prior Publication Data
US 2018/0126914 A1 May 10, 2018

(30) Foreign Application Priority Data

May 29, 2015 (AU) ................................ 2015902014
Oct. 16, 2015 (AU) ................................ 2015904253

(51) Int. Cl.
*B60R 7/12* (2006.01)
*A45B 11/00* (2006.01)
(Continued)

(52) U.S. Cl.
CPC ................ *B60R 7/12* (2013.01); *A45B 11/00* (2013.01); *A45B 25/00* (2013.01); *B60R 11/00* (2013.01);
(Continued)

(58) Field of Classification Search
CPC ... B60R 7/12; B60R 11/00; B60R 2011/0026; B60R 2011/0056; A45B 11/00; A45B 25/00; A45B 2025/003; B62B 9/147
(Continued)

(56) References Cited

U.S. PATENT DOCUMENTS 110,434 A * 12/1870 Clarkes .................. A01K 97/10
248/515
300,832 A * 6/1884 Ball ...................... A47L 13/512
248/113
(Continued)

FOREIGN PATENT DOCUMENTS

AU      2010214665 B2      3/2012
GB         401275 A      11/1933

OTHER PUBLICATIONS

European Patent Office, Extended European Search Report dated Jan. 4, 2019 issued in European Patent Application No. 16802226.7 filed on May 27, 2016.

*Primary Examiner* — Patrick D Hawn
(74) *Attorney, Agent, or Firm* — Gottlieb, Rackman & Reisman, P.C.

(57) ABSTRACT

A holding arrangement for holding an umbrella in a position to keep rain off a user while user is attending to matters in a vehicle with the vehicle door open, the holding arrangement is configured to be mounted to a vehicle door comprising a movable portion and a mountable portion, the movable portion including a securing arrangement for securing the holding arrangement to an umbrella the movable portion comprising engaging formations configured for conveniently removably engaging with complementary engaging formations on the associated mountable portion.

18 Claims, 32 Drawing Sheets

(51) Int. Cl.
*A45B 25/00* (2006.01)
*B60R 11/00* (2006.01)
*B62B 9/14* (2006.01)

(52) U.S. Cl.
CPC ........ *B62B 9/147* (2013.01); *A45B 2025/003* (2013.01); *B60R 2011/0026* (2013.01); *B60R 2011/0056* (2013.01)

(58) Field of Classification Search
USPC .......... 135/16; 248/511, 514, 518, 519, 520, 248/521, 523
See application file for complete search history.

(56) References Cited

U.S. PATENT DOCUMENTS

| | | | | |
|---|---|---|---|---|
| 2,992,804 A * | 7/1961 | Doran | ................ | A61G 7/0503 248/311.2 |
| 3,290,816 A * | 12/1966 | Eklof | ................ | A01K 97/10 248/516 |
| 3,762,360 A * | 10/1973 | Hawes | ................ | B60Q 7/005 116/173 |
| 4,017,998 A * | 4/1977 | Dumler | ................ | A01K 97/10 248/514 |
| 4,711,422 A | 12/1987 | Ibanez | | |
| 4,720,074 A * | 1/1988 | Gard | ................ | A45B 11/00 248/314 |
| 4,784,360 A * | 11/1988 | Mok | ................ | B60N 3/101 248/311.2 |
| 5,191,679 A * | 3/1993 | Harper | ................ | A47G 23/0225 16/363 |
| 5,232,137 A * | 8/1993 | Devine | ................ | A45F 5/02 222/175 |
| 5,249,770 A * | 10/1993 | Louthan | ................ | A47K 1/09 248/205.2 |
| 5,361,950 A * | 11/1994 | Signal | ................ | B60N 3/103 224/482 |
| 5,385,161 A | 1/1995 | Loker et al. | | |
| 5,411,237 A * | 5/1995 | Dougherty | ............. | A45B 11/00 224/274 |
| 5,431,364 A | 7/1995 | Etter | | |
| 5,657,957 A * | 8/1997 | Graham | ................ | A45B 11/00 224/274 |
| 5,762,308 A * | 6/1998 | Bryan | ................ | A45B 11/00 135/16 |
| 6,199,819 B1 * | 3/2001 | Churillo | ................ | A45B 11/00 135/16 |
| 6,435,469 B1 * | 8/2002 | Ratcliff | ................ | A45F 5/00 248/213.2 |
| 6,708,703 B1 * | 3/2004 | Rivers | ................ | A45B 11/00 135/16 |
| 7,740,220 B2 * | 6/2010 | Jeanveau | ................ | A45B 11/00 248/534 |
| 8,109,420 B2 * | 2/2012 | Martinez | ................ | A45F 5/02 224/197 |
| 8,141,839 B2 * | 3/2012 | Buchner | ................ | A63B 55/408 248/229.15 |
| 8,690,470 B2 * | 4/2014 | Cash | ................ | A47C 7/66 135/16 |
| 9,220,252 B1 * | 12/2015 | Arcabascio | ............ | A01K 97/10 |
| 9,827,917 B1 * | 11/2017 | Jones | ................ | B60R 11/00 |
| 9,944,209 B1 * | 4/2018 | Carnevali | ............ | B60N 3/105 |
| 10,099,542 B2 * | 10/2018 | Teague | ................ | B60J 5/0494 |
| 2002/0096616 A1 | 7/2002 | Ratcliff et al. | | |
| 2007/0210235 A1 * | 9/2007 | Hood | ................ | F16B 47/00 248/519 |
| 2013/0256355 A1 * | 10/2013 | Gatto-Weising | ........ | B60R 11/00 224/482 |
| 2015/0305453 A1 | 10/2015 | Gatto-Weising | | |

* cited by examiner

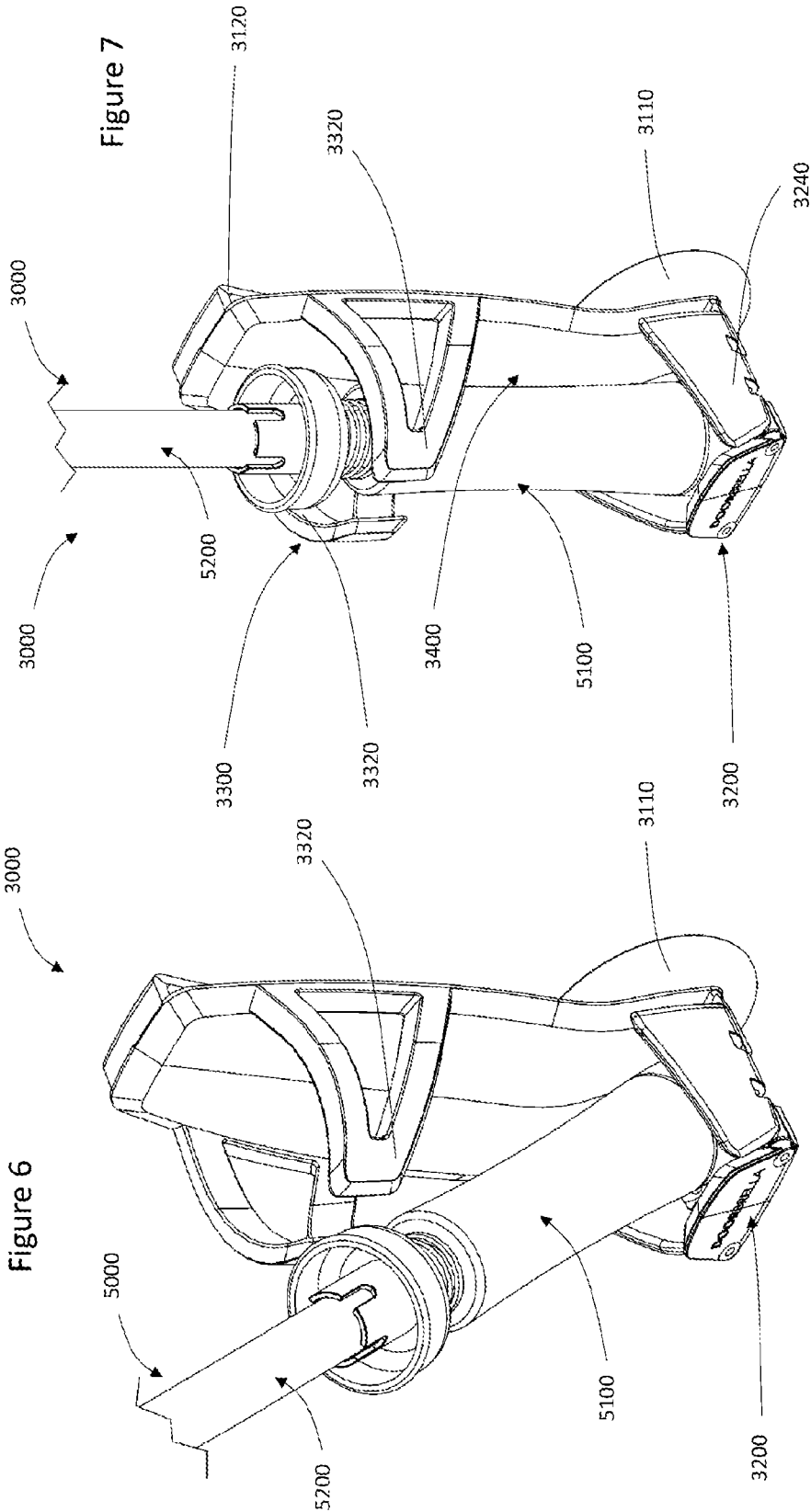

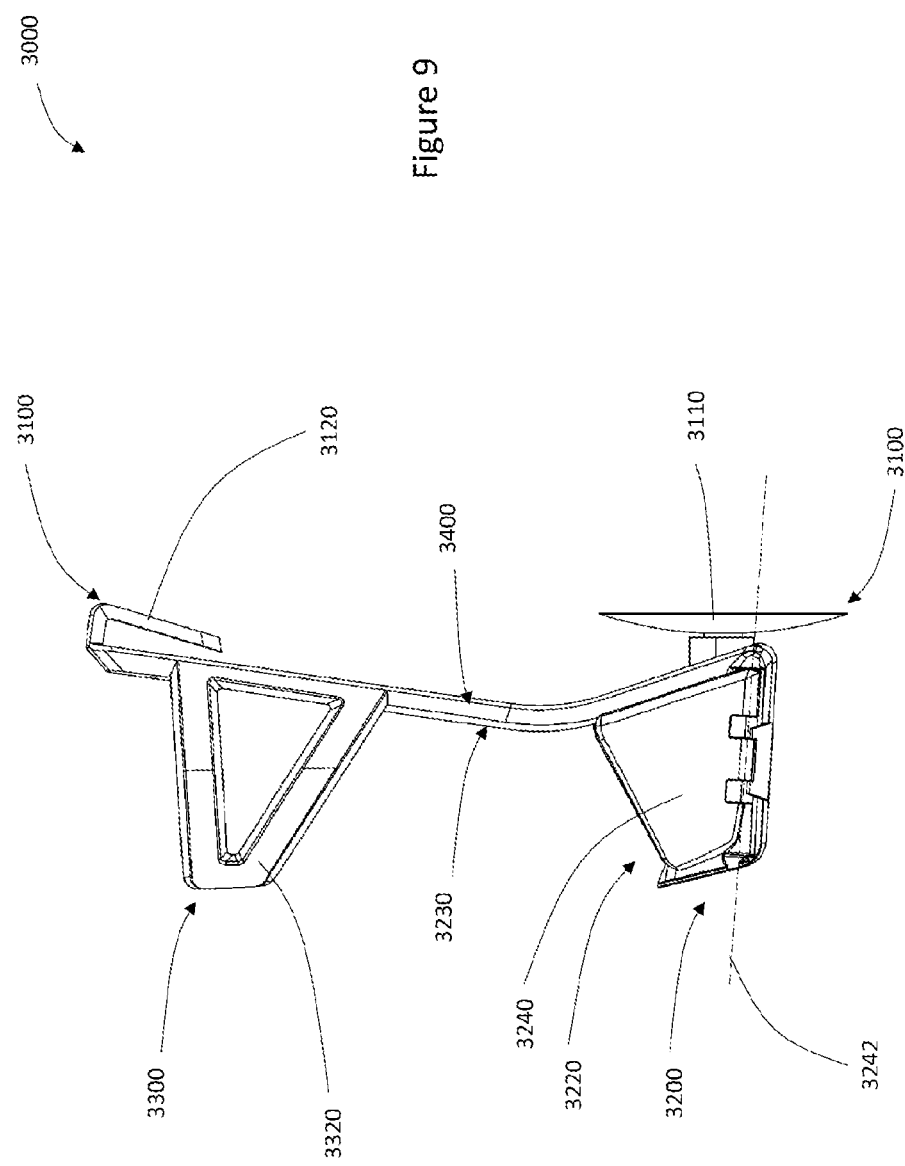

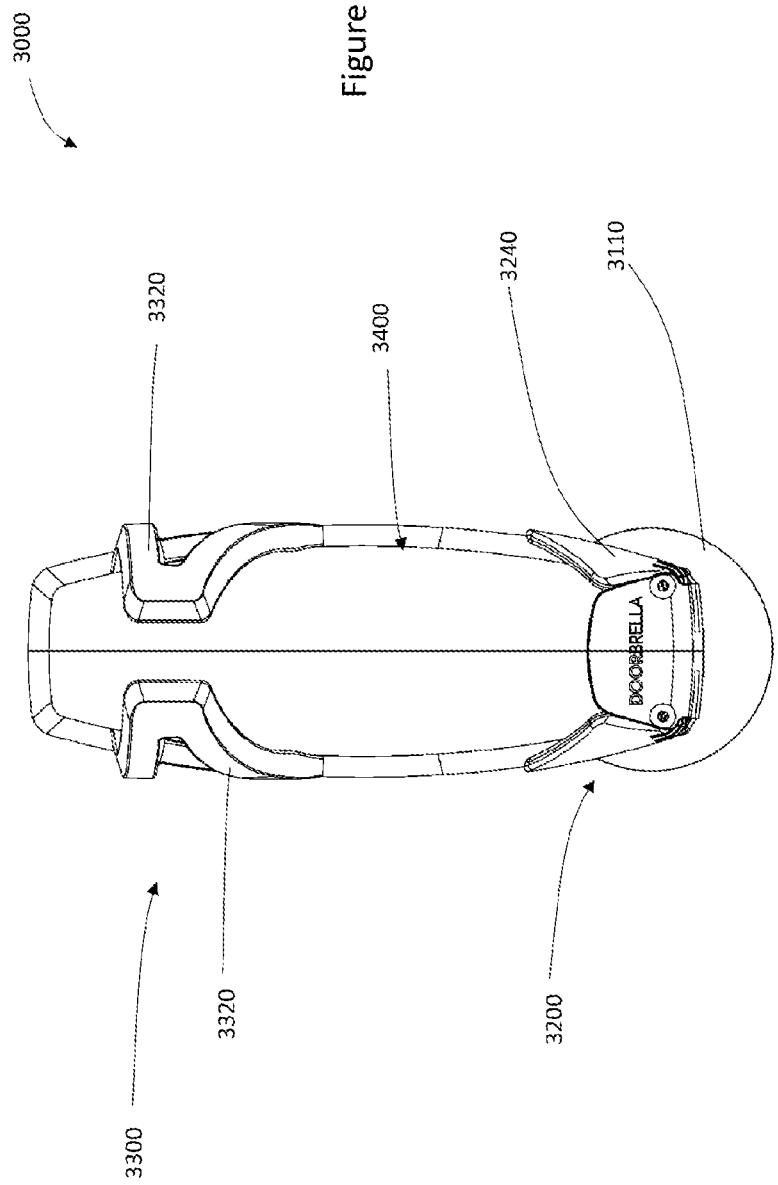

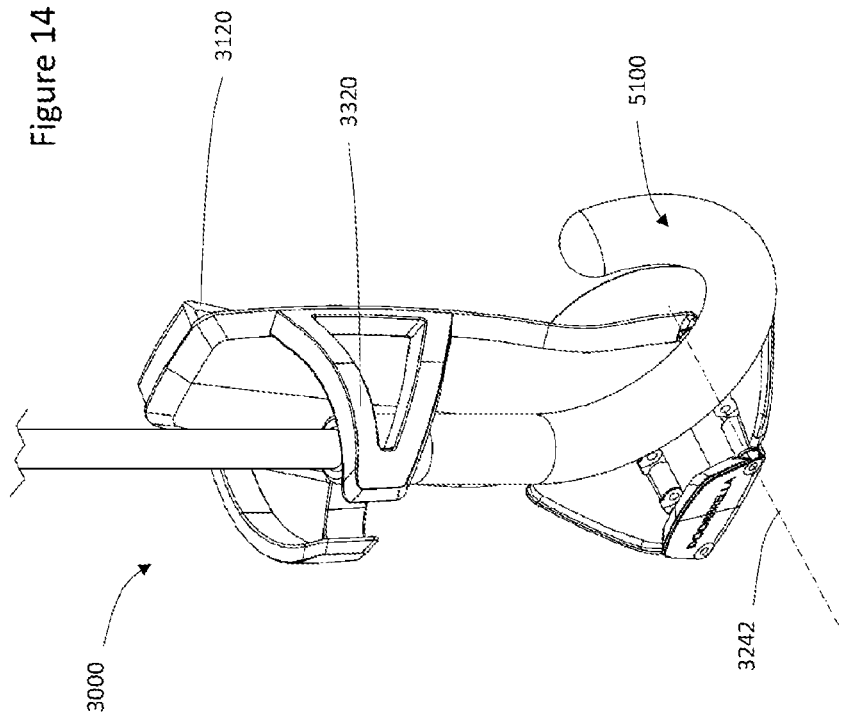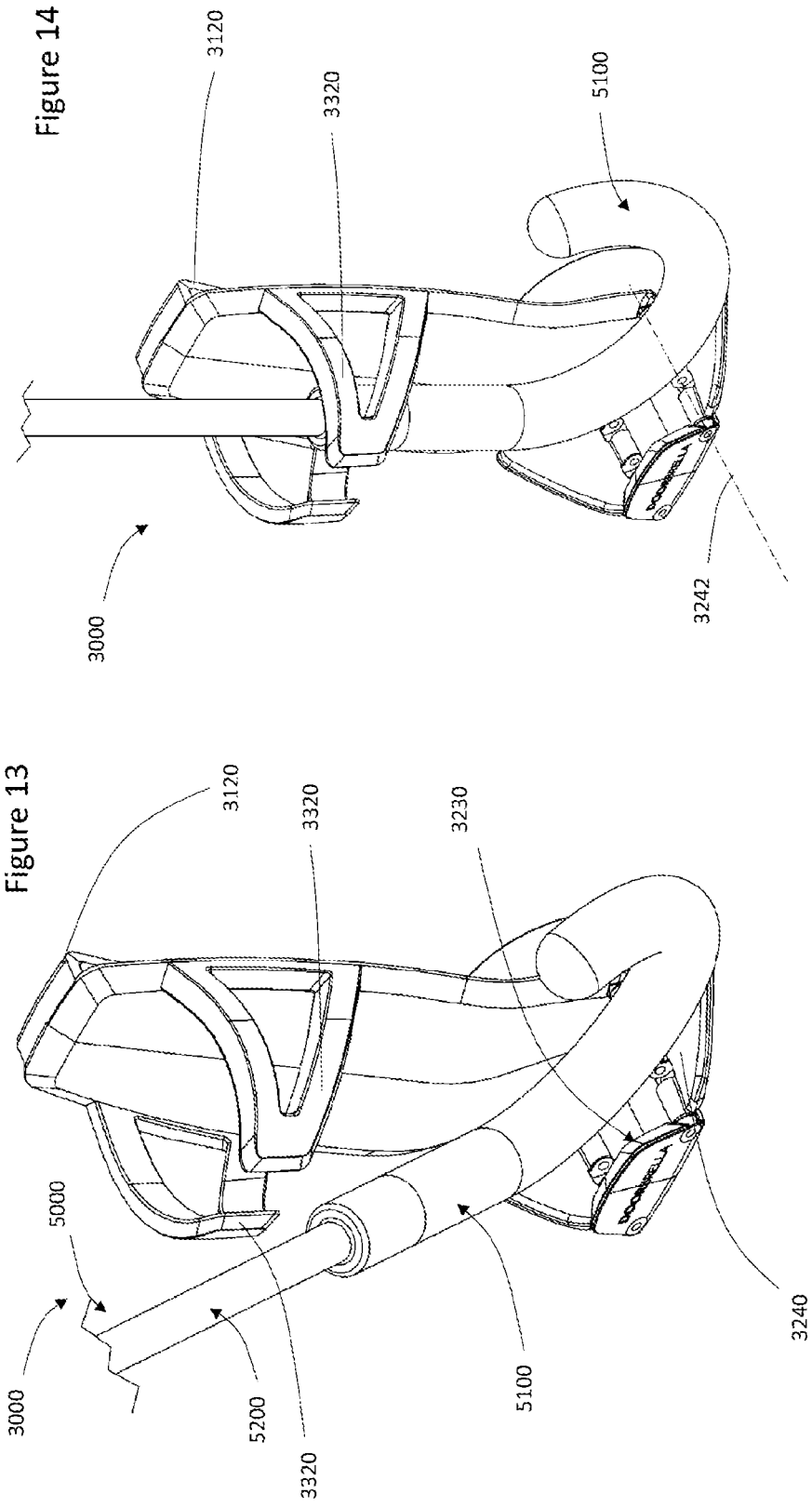

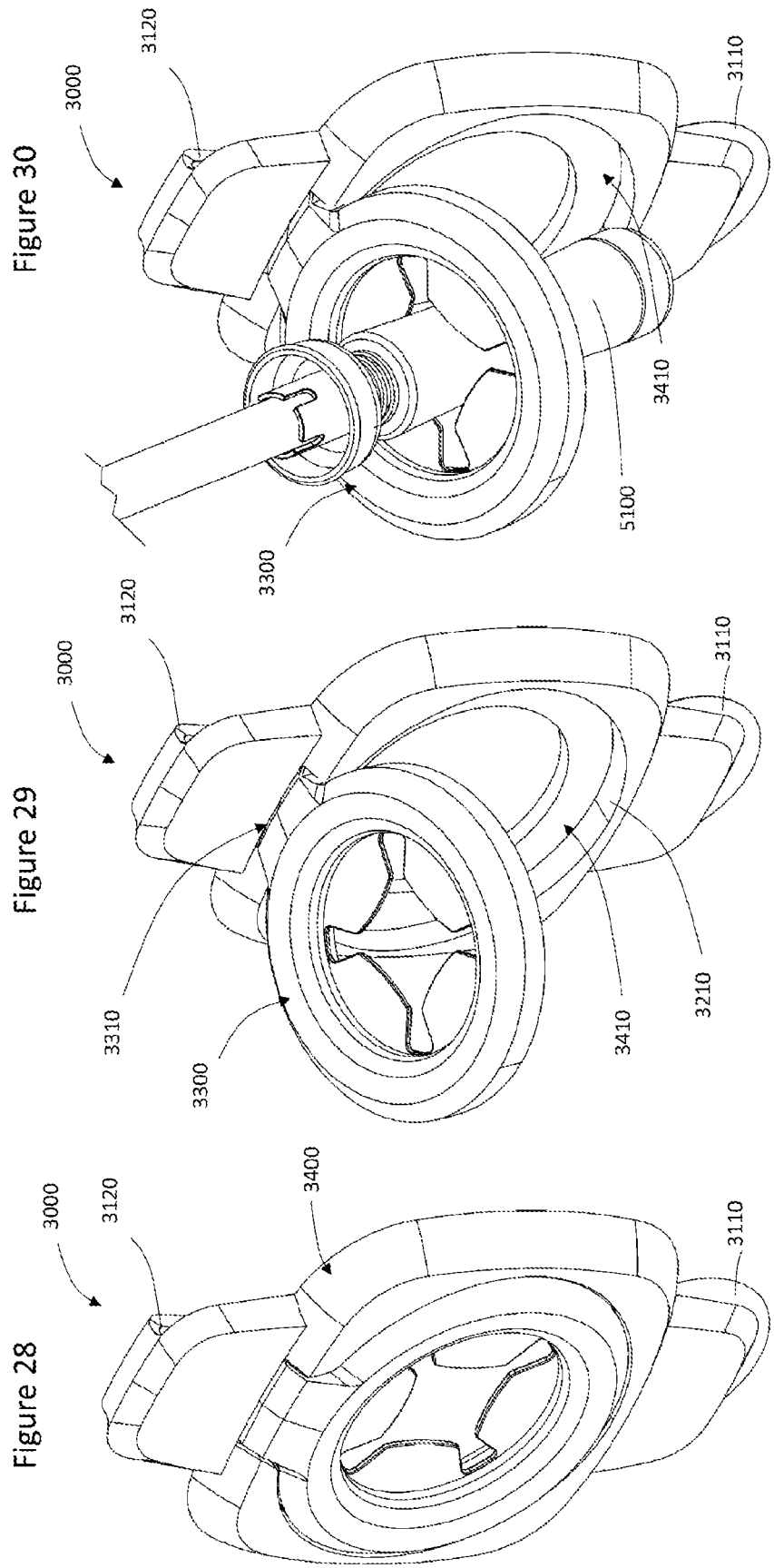

HOLDING ARRANGEMENT AND PROTECTIVE COVER

FIELD OF THE INVENTION

The present invention relates to a protective cover and in particular to a protective cover for providing rain protection to the driver or passenger of a vehicle, and a holding arrangement for holding a protective cover.

The invention has been developed primarily for use with protective cover attached to a vehicle and will be described hereinafter with reference to this application. However, it will be appreciated that the invention is not limited to this particular field of use. In particular it can be removable.

BACKGROUND OF THE INVENTION

Protective covers generally refer to the class of vehicles which are convertibles with a roof covering that extends between a storage position in which the whole driver and passenger area is open to the elements above or to a covering position at which the whole driver and passenger area is closed and protected from the elements above.

However such rain covers are allowing for the use of the vehicle as a sun appreciation vehicle during good weather and converting back to a normal covered sedan type vehicle when the weather is inclement.

It is also known on the class of vehicles of SUVs (Special Utility Vehicles), or campervans or Winnebago type vehicle to have a retractable blind type structure that is mounted in an elongated retractable mount along a nearly entire side of the box like vehicle and to extend to provide an outrigger tent canopy or an annex extends from the vehicle to form another tent room.

However such covers or extensions are allowing for the use of the vehicle in a stationery position to convert to a portion of a fixed position camping structure where the vehicle and the outrigger tent canopy and/or annex form a fixed position camping structure with ground engaging poles, pegs and the like.

Clearly such structures are not able to provide readily available ancillary protection without excessively limiting use of vehicle.

And objective of the present invention is to provide a protective cover, which will overcome or substantially ameliorate at least one or more of the deficiencies of the prior art, or to at least provide a viable alternative.

It is a further and/or alternative objective of the present invention to provide a holding arrangement which will overcome or at least partially ameliorate one or more deficiencies of the prior art, or to at least provide a viable alternative.

It is to be understood that, if any prior art information is referred to herein, such reference does not constitute an admission that the information forms part of the common general knowledge in the art, in Australia or any other country.

SUMMARY OF THE INVENTION

According to a first aspect of the present invention, a protective cover is provided by a protective cover for extending from a vehicle to allow a driver or passenger to be protected from the rain when alighting or boarding the vehicle.

In particular the invention provides a protective cover for extending to a covering position relative a vehicle to allow a driver or passenger to be protected from the external elements when alighting or boarding the vehicle from the passenger or the driver vehicle doorway, the protective cover including a cover means able to proceed from a storage position to a covering position; and supported in both positions by only the vehicle.

The cover means can be a flexible sheet. It can be the flexibility and/or the form of the cover means that allows it to proceed from a storage position to a covering position. For example the cover means can be a fan shape formed by flexible material or could be a flexible sheet with an accordion type expanding folded form.

Preferably the protective cover includes a support structure for supporting the cover means. This can be at the periphery of the cover means or a vertebrate structure throughout the cover means.

Preferably the support structure for supporting the cover means is mounted on the vehicle. In one preferred form the support structure is mounted on both the vehicle doorway and the vehicle door such that opening the door spaces the support structure with the cover means extends therebetween.

Other forms of the support structure can be tethering means such that it loosely extends to the other of the vehicle doorway and the vehicle door and in a type of window blind structure be extended by retracting the tethering means and thereby expanding the cover means.

Another form of support structure can be rigid support rods providing peripheral mounting of the cover means and able to be spaced from each other in a diverging manner corresponding with the area between an open vehicle door and the vehicle doorway. The support means can possibly including telescopic means t extend the divergence and increase the covering area beyond the normal area between the vehicle door and doorway.

The support structure for supporting the cover means can include rib like arrangements. In one form the support structure for supporting the cover means include umbrella like arrangements.

Preferably the protective cover has a support structure and cover means structured and able to be mounted on a vehicle such that it automatically extends the cover means from a storage position to a covering position and is supported in both positions by only the vehicle. The support structure can in one form automatically extend the cover means from a storage position to a covering position supported in both positions by only the vehicle wherein the opening of the door provides the automatic operation.

However also preferably in another form the protective cover selectively extends the cover means from a storage position to a covering position supported in both positions by only the vehicle wherein an activation means initiating an activation mechanism relatively operatively engaging the cover means and the support structure provides the selective operation. The activation means, which when activated, enables the cover to proceed from the storage position to the covering position.

Preferably the activation means receives and assesses initiation signals to provide initiation of activation mechanism to enable the cover to proceed from the storage position to the covering position.

Preferably the activation means acts as a retraction means and receives and assesses retraction signals to provide initiation of activation mechanism to enable the cover to proceed from the covering position to the storage position.

The activation means can be structured to receive and assess initiation signals of one or more of the following types:
a) external elements,
b) a vehicle status detector,
c) a passenger or driver initiation detector.

The external elements can be a weather condition such as rain or sunshine or heat.

The external elements can be an external environmental condition. This could be a natural environmental condition or an adjacent building environmental condition or even an external person condition or crowd reaction condition.

The external elements could be a security condition.

The material used for the cover means can be selectively a rain cover, sun cover, flying object barrier or heavy security such as Kevlar barrier.

The cover means is able to extend from a storage position to a selectable first extended covering position when the activation means has been activated and further extend to a second extended covering position. This can be undertaken automatically due to diverging telescopic support arms with cover means therebetween or by an additional flap or annex that can be activated simultaneously or subsequently. The second extended covering position could be co-planar so as to maintain a constant height or be at an angle so as to provide a partial cocoon protected area between the vehicle door and doorway.

The activation means can be initiated by a passenger initiation.

The activation means can be initiated by a vehicle status initiation.

The activation means can be initiated by a weather status initiation.

The activation means can be initiated by opening the door.

The activation means can be initiated prior to opening the door.

The activation means can be initiated prior to opening the door but activates as the door is opening.

It can be seen that the invention of a protective cover provides the benefit of increased protective cover beyond the footprint of the car from sun, rain or other element while not preventing the normal use of the vehicle.

According to a second aspect of the present invention, a protective cover is provided by a protective cover forming a retractable annex from the passenger or driver vehicle doorway According to a further aspect, the present invention may be said to broadly consist in a cover arrangement suitable for protecting a user from rain and/or inclement weather during ingress and/or egress of a vehicle door, the protective cover comprising:
a) a resilient foldable frame; and
b) a shielding member suitable for shielding a user from rain;
c) wherein the resilient foldable frame is configured for moving from a stowed condition in which the resilient frame stores potential energy, to a deployed condition in which the stored potential energy is reduced, and movement of the resilient foldable frame from its stowed condition to its deployed condition is driven by the stored potential energy in the resilient foldable frame; and
d) wherein the cover arrangement is configured to be deploy from a stowed position to a deployed position in which the shielding member is presented for protecting a user from rain, as the resilient foldable frame moves between its stowed condition and its deployed condition.

In one embodiment, the cover arrangement is configured to automatically deploy from its stowed position to its deployed position as the car door is opened.

In one embodiment, the shielding member is movable in association with the resilient foldable frame between a stowed position and a deployed position.

In one embodiment, the shielding member is stowed within the vehicle in its stowed position.

In one embodiment, the resilient foldable frame is composed of spring steel.

In one embodiment, the resilient foldable frame is composed of flexible elongate spring steel.

In one embodiment, the shielding member is flexible.

In one embodiment, the shielding member is composed of fabric.

In one embodiment, the shielding member is composed of waterproof fabric.

In one embodiment, the cover arrangement is configured for being securely mounted to a vehicle.

In one embodiment, the cover arrangement comprises mounting formations for mounting the cover arrangement on one or more selected from the body of a vehicle and a door of a vehicle.

In one embodiment, the mounting formations comprise one or more selected from:
a) clamping formations;
b) hook formations;
c) hook and loop formations;
d) resin bonding patches;
e) or the like.

In one embodiment, the shielding member is configured to act as a sun screen for the vehicle when in its deployed position in use.

In one embodiment, the cover arrangement is configured to deploy from its stowed position to its deployed position automatically when said vehicle door is opened.

In one embodiment, the cover arrangement comprises an engaging arrangement for engaging the cover arrangement to thereby move the cover arrangement from its deployed position to its stowed position to close the vehicle door.

In one embodiment, the engaging arrangement comprises a loop of webbing.

According to a further aspect, the invention may be said to broadly consist in a holding arrangement for holding an umbrella, the holding arrangement comprising
a) a movable portion, the movable portion including
  i) a securing arrangement for securing the holding arrangement to an umbrella;
  ii) the movable portion further comprising engaging formations configured for convenient removably engaging with complementary engaging formations on an associated mountable portion; and
b) a mountable portion, the mountable portion comprising
  i) complementary engaging formations configured for convenient removably engaging with the engaging formations of the movable portion;
  ii) the mountable portion being configured to be mounted to one or more selected from
    (1) a vehicle door,
    (2) a stroller,
    (3) a handle,
    (4) or any item to which an umbrella is required to be attached.

In one embodiment, the holding arrangement comprises a mounting arrangement configured for mounting the mountable portion to said one or more selected from a vehicle door, a stroller, a handle, or any item to which an umbrella is required to be attached.

In one embodiment, the mountable portion comprises a body.

Securing Arrangement

In one embodiment, the securing arrangement comprises a receiving formation into which the stem of an umbrella is receivable.

In one embodiment, the receiving formation is cup-shaped.

In one embodiment, the securing arrangement comprises a wedging formation for wedging at least part of an umbrella into.

In one embodiment, the receiving formation comprises a pivoting portion configured for allowing reception of a curved umbrella handle into the receiving formation.

In one embodiment, the receiving formation comprises one or more selected from an aperture and a recess configured for allowing reception of a curved umbrella handle into the receiving formation In one embodiment, the receiving formation comprises a clamping formation for securely clamping an umbrella to the movable portion.

In one embodiment, the clamping formation comprises a threaded screw member.

In one embodiment, the threaded screw member is configured to be screwed through an aperture in the receiving formation.

In one embodiment, the securing arrangement comprises one or more selected from
- a) a clamping fitting configured for clamping onto an umbrella;
- b) a resilient snap fit type fitting configured for resiliently snapping or clipping onto an umbrella;
- c) an elastic fitting configured for being stretched around at least part of an umbrella;
- d) a threaded fitting;
- e) a spigot and socket type fitting;
- f) an interference fit fitting;
- g) a sucker-type fitting;
- h) a hook-type fitting and
- i) a bayonet type fitting.

In one embodiment, the clamping fitting is configured to clamp onto one or more selected from the stem of an umbrella and the handle of an umbrella.

Engaging Formation and Complementary Engaging Formation

In one embodiment, the engaging formation and complementary engaging formation comprises at least one sliding lug formation receivable within a slot.

In one embodiment, the slot comprises a restricted neck formation configured for preventing removal of the sliding lug formation transversely from the slot.

In one embodiment, one or more selected from the engaging formations and the complementary engaging formations are mounted on a rotating bezel portion that allows for pivoting movement of the receiving portion relative to the mounting arrangement.

In one embodiment, one or more selected from the engaging formations and the complementary engaging formations comprises at least one or more selected from
- a) a clamping fitting;
- b) a resilient snap-fit-type fitting;
- c) an elastic-type fitting;
- d) a threaded-type fitting;
- e) a sucker-type fitting;
- f) a spigot and socket-type fitting;
- g) an interference fit-type fitting;
- h) a hook-type fitting; and
- i) a bayonet-type fitting.

Mountable Portion

In one embodiment, the mountable portion comprises a mounting arrangement configured for mounting the mountable portion to one or more selected from
- a) a vehicle door,
- b) a stroller,
- c) a handle,
- d) or any item to which an umbrella is required to be attached.

In one embodiment, the mounting arrangement comprises one or more selected from
- a) a clamping fitting;
- b) a resilient snap-fit-type fitting;
- c) an elastic-type fitting;
- d) a threaded-type fitting;
- e) a sucker-type fitting;
- f) a spigot and socket-type fitting;
- g) an interference fit-type fitting;
- h) a hook-type fitting; and
- i) a bayonet-type fitting.

In one embodiment, the mounting arrangements are pivotally connected to the body.

In one embodiment, the mounting arrangements are configured and adapted for allowing adjustable movement of the body relative to the window in operation.

In one embodiment, the holding arrangement comprises an alignment adjustment arrangement configured for allowing angular adjustment of at least part of the holding arrangement relative to a vehicle.

In one embodiment, the alignment adjustment arrangement comprises at least one pivoting arrangement allowing pivotal movement of the body relative to the mounting arrangements.

In one embodiment, the movable portion defines a receptacle.

In one embodiment, the holding arrangement comprises a lateral support formation for laterally supporting an umbrella in operation.

In one embodiment, the lateral support formation is biased to engage with an umbrella in operation to laterally support the umbrella.

In one embodiment, the lateral support formation comprises a tapered engaging formation configured for engaging with an umbrella in operation.

In one embodiment, the lateral support formation is movable between an open position in which an umbrella is receivable into the base support formation operationally, and a holding position in which an umbrella is laterally supported In one embodiment, when the lateral support formation is in its holding position, it prevents removal of an umbrella from the base support formation operationally.

In one embodiment, the lateral support formation is biased towards its closed position.

In one embodiment, the lateral support formation is mounted to the movable portion.

In one embodiment, the lateral support formation is mounted to the receptacle.

In one embodiment, the lateral support formation is pivotably mounted to the receptacle.

In one embodiment, the lateral support formation is mounted to the mountable portion.

In one embodiment, the lateral support formation comprises a detent formation configured for preventing vertical removal of the umbrella from the base support formation when the lateral support formation is in its holding position.

In one embodiment, the lateral support formation comprises a manual manipulation formation configured for being manipulated by a user to move the lateral support formation between its open position and its holding position.

According to a further aspect, the invention may be said to consist in a holding arrangement for holding an umbrella to a vehicle, the holding arrangement comprising:
  a) mounting formations configured for mounting the holding arrangement to a vehicle;
  b) a base support formation configured for upwardly supporting the handle of an umbrella; and
  c) a lateral support formation configured for engaging with and laterally supporting one or more selected from the shaft and the handle of an umbrella.

In one embodiment, the holding arrangement comprises a body.

In one embodiment, the body defines the base support formation.

In one embodiment, one or more selected from the base support formation and the lateral support formation is configured for pivotable engagement with the body.

In one embodiment, one or more selected from the base support formation and the lateral support formation comprises pivoting formations enabling pivotable engagement with the body.

In one embodiment, one or more selected from the base support formation and the lateral support formation is configured for movement between a deployed position and a stowed position in which said one or more selected from the base support formation and the lateral support formation is abutted with the body.

In one embodiment, when in its stowed position, said one or more selected from the base support formation and the lateral support formation is at least partially received within a recess in the body.

In one embodiment, the mounting formations are configured for mounting the holding arrangement to one or more selected from a vehicle door, a vehicle body, and a vehicle window.

In one embodiment, the mounting formations comprise one or more selected from
  a) a clamping fitting;
  b) a resilient snap fit type fitting;
  c) an elastic fitting;
  d) a threaded fitting;
  e) a sucker-type fitting
  f) a hook-type fitting; and
  g) a bayonet-type fitting.

In one embodiment, the mounting formations are pivotally connected to the body.

In one embodiment, wherein the mounting formations are configured and adapted for allowing adjustable movement of the body relative to the window in operation.

In one embodiment, wherein the holding arrangement comprises an alignment adjustment arrangement configured for allowing angular adjustment of at least part of the holding arrangement relative to a vehicle.

In one embodiment, the alignment adjustment arrangement comprises at least one pivoting arrangement allowing pivotal movement of the body relative to the mounting formations.

In one embodiment, the base support formation defines a receptacle.

In one embodiment, the lateral support formation is biased to engage with an umbrella in operation to laterally support the umbrella.

In one embodiment, the lateral support formation comprises a biasing arrangement.

In one embodiment, the lateral support formation comprises a tapered engaging formation configured for engaging with an umbrella in operation.

In one embodiment, the lateral support formation is movable between an open position in which an umbrella is receivable into the base support formation operationally, and a holding position in which an umbrella is laterally supported In one embodiment, when the lateral support formation is in its holding position, the lateral support formation prevents removal of an umbrella from the base support formation operationally.

In one embodiment, the lateral support formation is biased towards its closed position.

In one embodiment, the lateral support formation is mounted to the receptacle.

In one embodiment, the lateral support formation is pivotably mounted to the receptacle.

In one embodiment, the lateral support formation comprises a detent formation configured for preventing vertical removal of the umbrella from the base support formation when the lateral support formation is in its holding position.

In one embodiment, the lateral support formation comprises a manual manipulation formation configured for being manipulated by a user to move the lateral support formation between its open position and its holding position.

In one embodiment, the lateral support formation is pivotably mounted to the receptacle at a hinge.

In one embodiment, the lateral support formation is pivotably mounted or mountable to the receptacle by a snap fit type pivoting fitting.

In one embodiment, the lateral support formation is pivotably mounted or mountable to the receptacle by a snap fit type pivoting fitting configured for pivoting about a lug mounted to the receptacle.

In one embodiment the snap fit type pivoting fitting is configured for being inserted between a gap between a lug mounted on the receptacle in a resilient fashion while undergoing elastic deformation, to thereafter prevent removal of the lateral support formation from the receptacle.

In one embodiment, the lug is configured to prevent removal of the snap fit type pivoting fitting.

In one embodiment, the snap fit type pivoting fitting comprises a barb formation and a backstop formation.

In one embodiment, the barb formation and backstop formation are configured for retaining the lug between them while allowing pivotal movement of the lateral support formation about the lug.

Other aspects of the invention are also disclosed.

BRIEF DESCRIPTION OF THE DRAWINGS

Notwithstanding any other forms which may fall within the scope of the present invention, preferred embodiments of the invention will now be described, by way of example only, with reference to the accompanying drawings in which:

FIG. 6 shows top front perspective view of first embodiment of a holding arrangement and an umbrella;

FIG. 7 shows a top front perspective view of a first embodiment of a holding arrangement holding an umbrella;

FIG. 9 shows a left side view of a second embodiment of a holding arrangement;

FIG. 10 shows a front view of a second embodiment of a holding arrangement;

FIG. 13 shows a top front perspective view of a second embodiment of a holding arrangement and an umbrella being inserted;

FIG. 14 shows a top front perspective view of a second embodiment of a holding arrangement holding an umbrella;

FIG. 28 shows a top perspective view of a fifth embodiment of a holding arrangement with the lateral support formation in its stowed position;

FIG. 29 shows a top perspective view of a fifth embodiment of a holding arrangement with the lateral support formation in its deployed position;

FIG. 30 shows a top perspective view of a fifth embodiment of a holding arrangement with the lateral support formation in its deployed position holding an umbrella;

DESCRIPTION OF PREFERRED EMBODIMENTS

Figure 1:
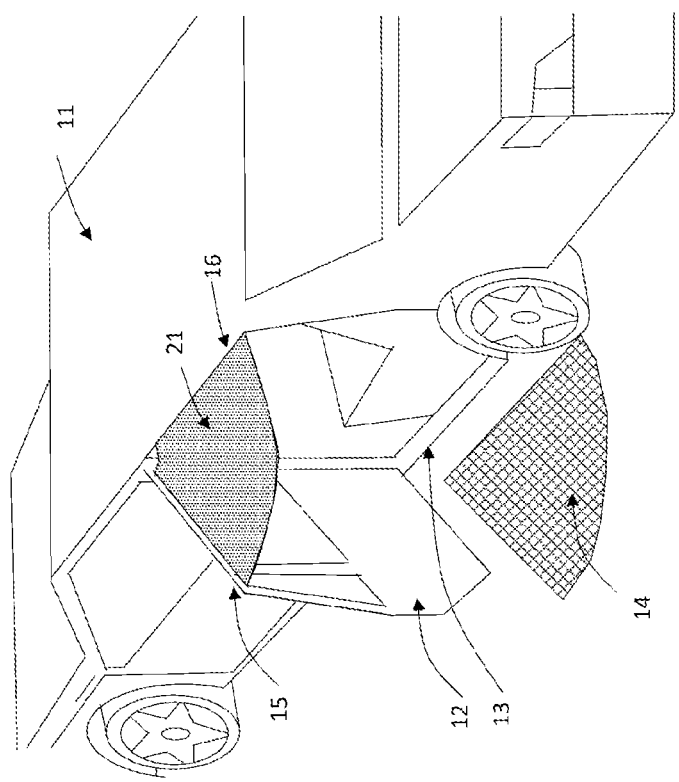
FIG. 1 shows a top perspective view of of a protective cover in accordance with a first preferred embodiment of the present invention.

It should be noted in the following description that like or the same reference numerals in different embodiments denote the same or similar features.

Referring to the drawings there is shown a protective cover 12 for extending to a covering position 14 relative a vehicle 11 to allow a driver or passenger to be protected from the external elements when alighting or boarding the vehicle from the passenger or the driver vehicle doorway.

The protective cover 12 includes a shielding member or cover means 21 able to proceed from a storage mode 110 in which the cover means 21 is in a storage position to a protective mode 115 in which the cover means 21 is in a covering position. In a normal operation this covering position substantially includes the area between the opened door and the vehicle. In essence the footprint of the cover means 21 can form a protected area 14 into which the driver or passenger can alight from the vehicle 11 and still be in a protected position.

As shown in FIG. 1 the cover means 21 is able to expand to an extended covering position substantially at the height of the vehicle or vehicle door to substantially cover the position 14 between the opened door 12 and the vehicle doorway 13. However in other forms the cover means 21 can be able to expand to an extended covering position above the height of the vehicle or vehicle door to substantially cover the position between the opened door and the vehicle. One form of such coverage is the umbrella version of FIG. 4.

As shown in FIG. 1, in one form the expanding cover is a collapsing fan arrangement. This can be facilitated by the cover means 21 being an accordion structured expanding cover. It is also envisaged that the protective cover 12 can include an activation means or activation mechanism configured for activating deployment of the shielding member 21 from its storage position to its covering position.

In another embodiment, it is envisaged that the shielding member 21 can be a retractable annex fixed in an elongated retractable means at one end to the vehicle or vehicle door and tethered at the other end to the vehicle door or vehicle wherein the act of opening the door activates deployment of the shielding member 21 from a retracted storage position to expand to an extended covering position.

The cover means 21 can be an expanding cover extending from the vehicle 16 to the top of the passenger or driver vehicle door 15 to automatically open when door 12 is opened and cover the zone or region 14 between the vehicle 13 and the passenger or driver vehicle door 12.

Figure 34:
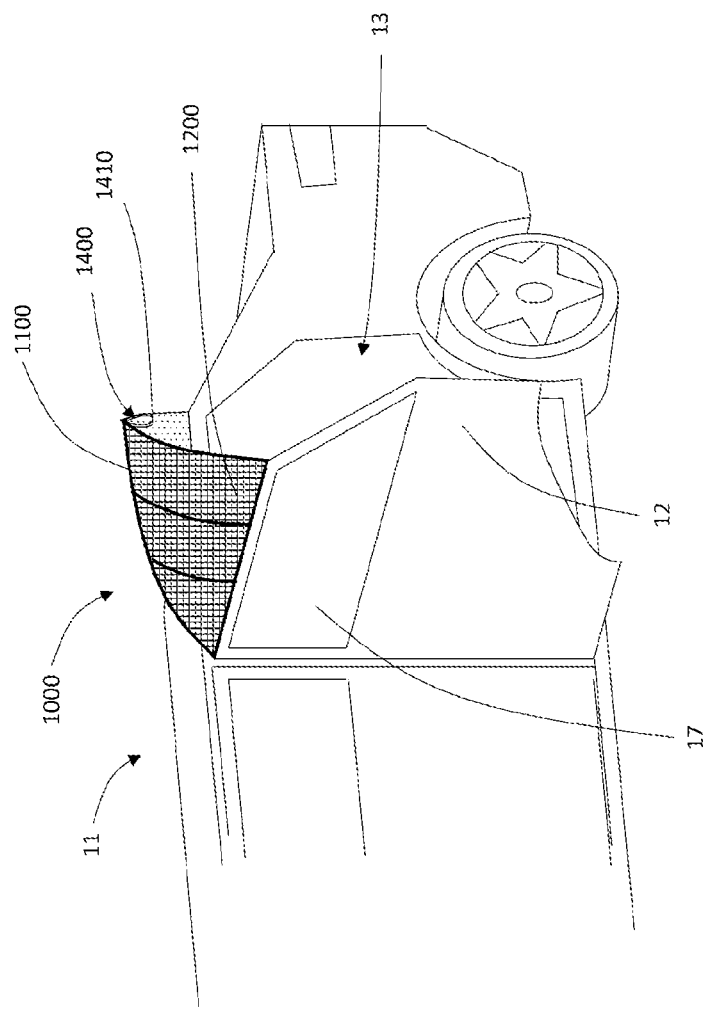
FIG. 34 shows a top perspective view of a cover arrangement installed on a vehicle, with the cover arrangement in its deployed position.
Figure 35:
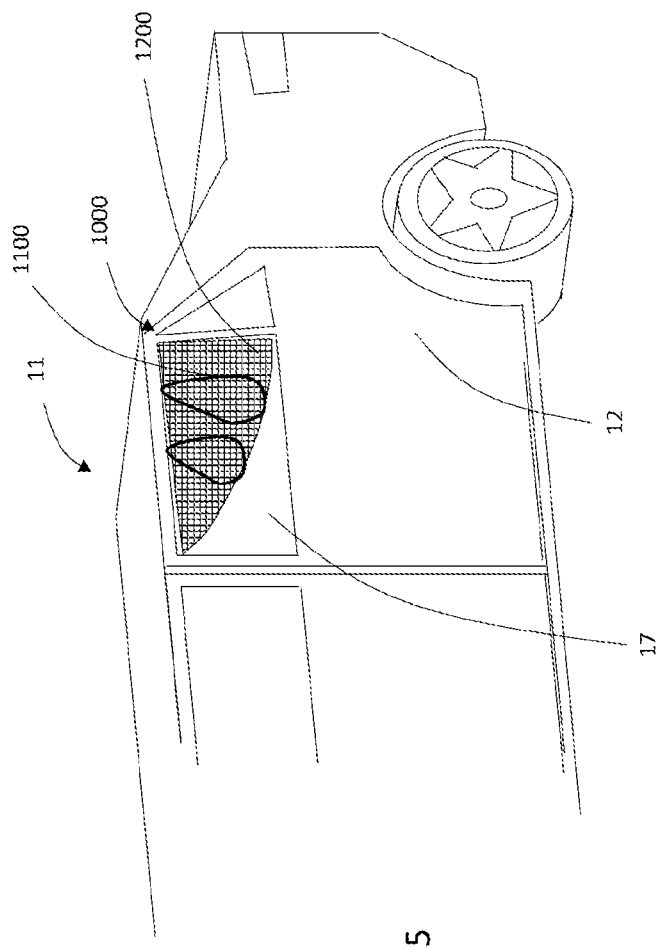
FIG. 35 shows a top perspective view of a cover arrangement installed on a vehicle, with the cover arrangement in its stowed position.

One embodiment of a cover arrangement 1000 is shown in FIGS. 34 and 35. The cover arrangement 1000 is suitable for protecting a user from rain and/or inclement weather while the user is moving into or out of the door 12 of a vehicle 11.

The cover arrangement 1000 comprises a resilient foldable frame 1100 and a shielding member 1200. The shielding member 1200 is preferably comprised of a water resistant fabric or plastic sheet 1210 that is suitably waterproof for shielding a user from rain.

The resilient foldable frame 1100 is configured for moving between a stowed condition and a deployed condition. When the resilient foldable frame is in its stowed condition, the resilient frame 1100 stores potential energy by virtue of its resilience, within the resilient foldable frame.

When the resilient foldable frame 1100 is in its deployed condition, the stored potential energy is reduced relative to its stowed condition. Movement of the resilient foldable frame 1100 from its stowed condition to its deployed condition is driven by the potential energy stored within the resilient foldable frame 1100.

In one preferred embodiment, the resilient foldable frame 1100 can be comprised of elongate, flexible, resilient spring steel members or batons (not shown) that are received within patent pockets, preferably sewn into the fabric sheet 1210 of the shielding member 1200. Such technologies are known and available for use in, for example, shade covers for use on beaches, and a discussion of the technology is not considered within the scope of this specification.

Using the stored potential energy in the foldable frame 1100, the foldable frame 1100 is configured to be automatically deployed from its stowed condition to its deployed condition on opening of the vehicle door.

In a preferred embodiment, the cover arrangement 1000 includes an engaging arrangement 1400, preferably in the form of a loop of webbing 1410, that is configured to be engaged by a user to move the resilient foldable frame 1100 from its deployed condition to its stowed condition before closing the vehicle door. In this way, potential energy is imparted into the resilient foldable frame 1100 by the user before closing the vehicle door 12, leaving it ready to automatically move from stowed condition to its deployed condition the next time the vehicle door is opened, thereby causing movement of the shielding member 1200 from its stowed position to its deployed position, and preferably in association with the movement of the foldable frame 1100 from its stowed condition to its deployed condition.

Preferably, as the user imparts potential energy into the resilient foldable frame by pulling downwardly on the loop 1410 to move the resilient foldable frame into its stowed condition, the cover arrangement 1000 will be configured to be received within the inner cabin of the vehicle 11 on closing of the vehicle door 12. In a most preferred embodiment as shown in FIG. 35, when the cover arrangement 1000 is in its stowed position, it can further serve as a sun shield for occupants of the vehicle.

Preferably, the cover arrangement is configured for being securely mounted to a vehicle. In this regard it is envisaged that the cover arrangement 1000 will comprise mounting formations for mounting the cover arrangement to both the vehicle body and the vehicle door 12.

In one embodiment, the cover arrangement comprises mounting formations (not shown) for mounting the cover arrangement on one or more selected from the body of a vehicle and a door of a vehicle. It will be appreciated that a suitable mounting formations could have a variety of mounting to a vehicle body and/or vehicle door, and could use a wide variety of suitable mounting formations. Some examples of suitable mounting formations could include any one or more of clamping formations, sucker formations, hook formations, hook and loop formations, resin bonds, bonding patches, or the like. In a preferred embodiment, it is envisaged that a combination of regularly spaced sucker formations (not shown) will be used for mounting the cover arrangement 1000 to the window of a vehicle, while regularly spaced hook formations (not shown) will be used to attach the opposed side of the cover arrangement 1000 to the inner upholstery of a vehicle.

Preferably the shielding member 21 is able to extend from a retracted storage position to an extended covering position when the activation means has been selectively activated or activated upon receiving detected initiation signals fulfilling predefined criteria. It is anticipated that the activation means could be selectively activated by operation of the vehicle door, for example by moving it from a closed position to an open position. Alternatively, it is envisaged that initiation or actuation signals can be received from sensors, and fulfilling predefined criteria, to thereby actuate deployment of the shielding member 21. Once the deployment of the shielding member 21 has been activated, then the cover means is able to extend from a concealed storage position to a revealed covering position.

The protective cover includes in one form an activation means 132, which when activated, enables the cover to proceed from the storage position in the storage mode 110 to the covering position in the protective mode 115 by engaging an activation mechanism 131 to physically enable the movement of cover means 21.

The activation means is operationally connected to one or more sensors or detectors 135, 136 so it can receive and assess initiation signals to provide initiation of activation mechanism to enable the shielding member 21 to proceed from the storage position to the covering position. The detectors can be of various forms including detecting external elements, a vehicle status detector, or a passenger/driver initiation detector.

In the form of an external element detector the detector can be for:
   a) detecting the external elements is a weather condition.
      i) the external elements include the weather condition of rain.

ii) the external elements include the weather condition of sunlight.
b) detecting the external elements is an external environmental condition.
   i) the external elements include an adjacent building environmental condition.
   ii) the external elements include an external person condition.
   iii) the external elements include crowd reaction condition.
c) Detecting the external elements include a security condition.

In the form of a passenger or driver initiation detector, the activation means is initiated by a passenger initiation.

In the form of a vehicle status detector, the activation means is initiated by a vehicle status initiation. This can include:
a) the vehicle has stopped
b) the activation means is initiated by opening the door
c) the activation means is initiated prior to opening the door.
d) the activation means is initiated prior to opening the door but activates as the door is opening.

Preferably the activation means is initiated by a combination of detected positions such as a vehicle status and by a weather status initiation.

A protective cover can have the cover means able to extend from a storage position to a selectable first extended covering position 14A when the activation means has been activated and further extend to a second extended covering position 14B.

Figure 2:
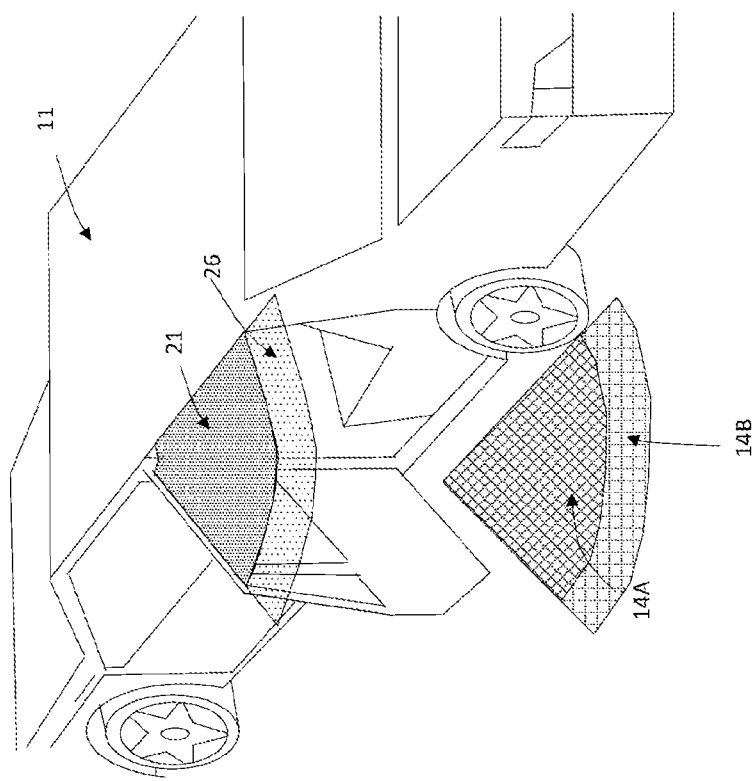
FIG. 2 shows a top perspective view of a protective cover in accordance with a second preferred embodiment of the present invention having an extension.

As shown in FIGS. 2 the cover means can be an expanding cover having expansion annexures for increasing the coverage to greater than the region between the vehicle and the passenger or driver vehicle door.

Figure 3:
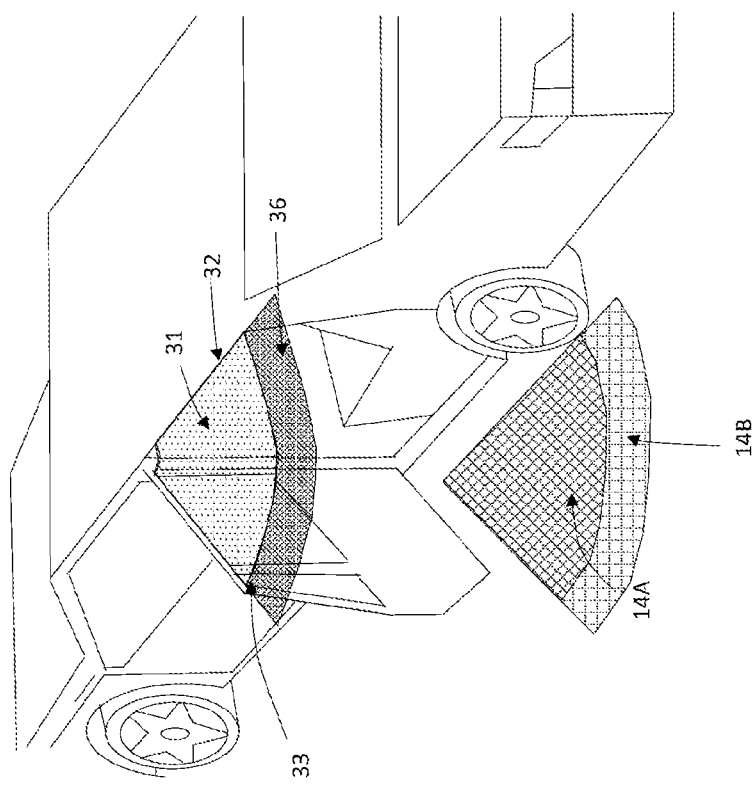
FIG. 3 shows a top perspective view of a protective cover in accordance with a third preferred embodiment of the present invention having an extension.

In FIG. 3 the cover means 31 has telescopic support rods 32 and 33 which are mounted at the top of the vehicle door 12 and top of the vehicle doorway 13 with expansion annexures 36 being supported by the telescopic support rods. In this way in the first extension the support rods can fit within the doorway while in the telescopically extended form there is an increase in the coverage to a protected region 14B in addition to the normal protected region 14A between the vehicle 13 and the passenger or driver vehicle door 12.

Figure 4:
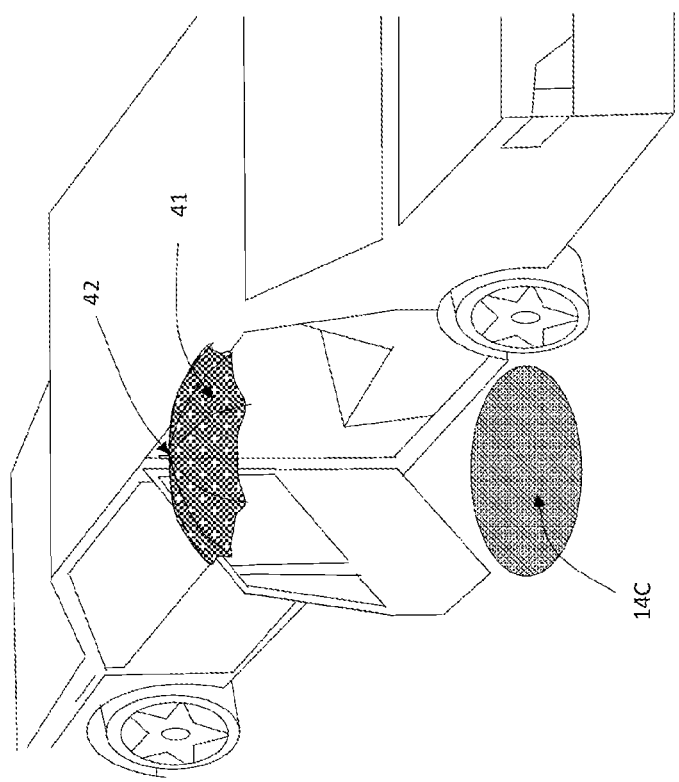
FIG. 4 shows a top perspective view of a protective cover in accordance with a fourth preferred embodiment of the present invention.

In one form as shown in FIG. 4 there is protective cover 41 for extending to a covering position for covering covered zone 14C relative a vehicle to allow a driver or passenger to be protected from the external elements when alighting or boarding the vehicle from the passenger or the driver vehicle doorway. However in this form the protective cover includes a cover means 41 and a support structure 42 with the cover means being a flexible sheet and the support structure including rigid or flexible support rods for supporting the cover means and including rib like arrangements in an umbrella like arrangement.

The protective cover therefore includes a cover means in the form of a shielding member able to proceed from a storage position to a covering position; and supported in both positions by only the vehicle. However the support structure for supporting the cover means mounted on the vehicle can be the central support of the umbrella like arrangement and thereby not require mounting to the vehicle door and doorway but extend above the height of the vehicle and provide the suitable protected area 14. The activation mechanism can therefore both collapse the umbrella like arrangement as well as automatically deflect the supporting arm to the required storage position. The structure can work with mechanical linkages to the door opening or be separately operative with electric drive motors (not shown) and actuators (not shown).

Figure 5:
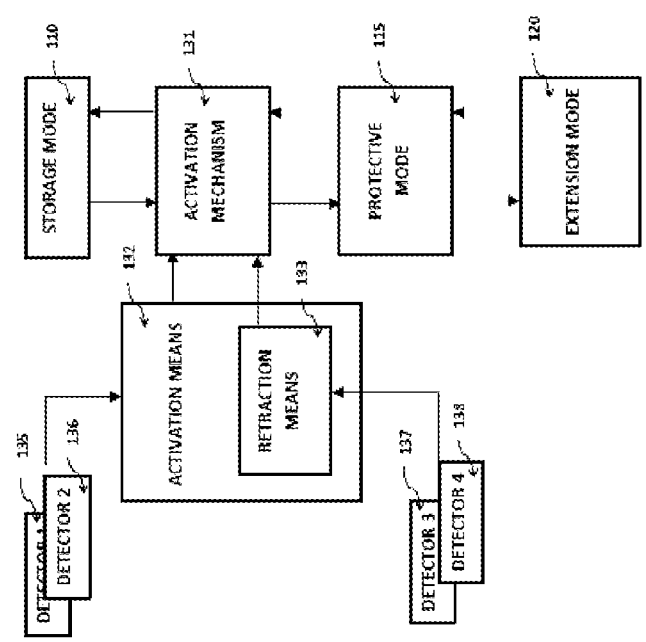
FIG. 5 shows an flow diagram of a preferred operation of a protective cover in accordance with a preferred embodiment of the present invention such as in FIGS. 1 to 4.
Figure 8:
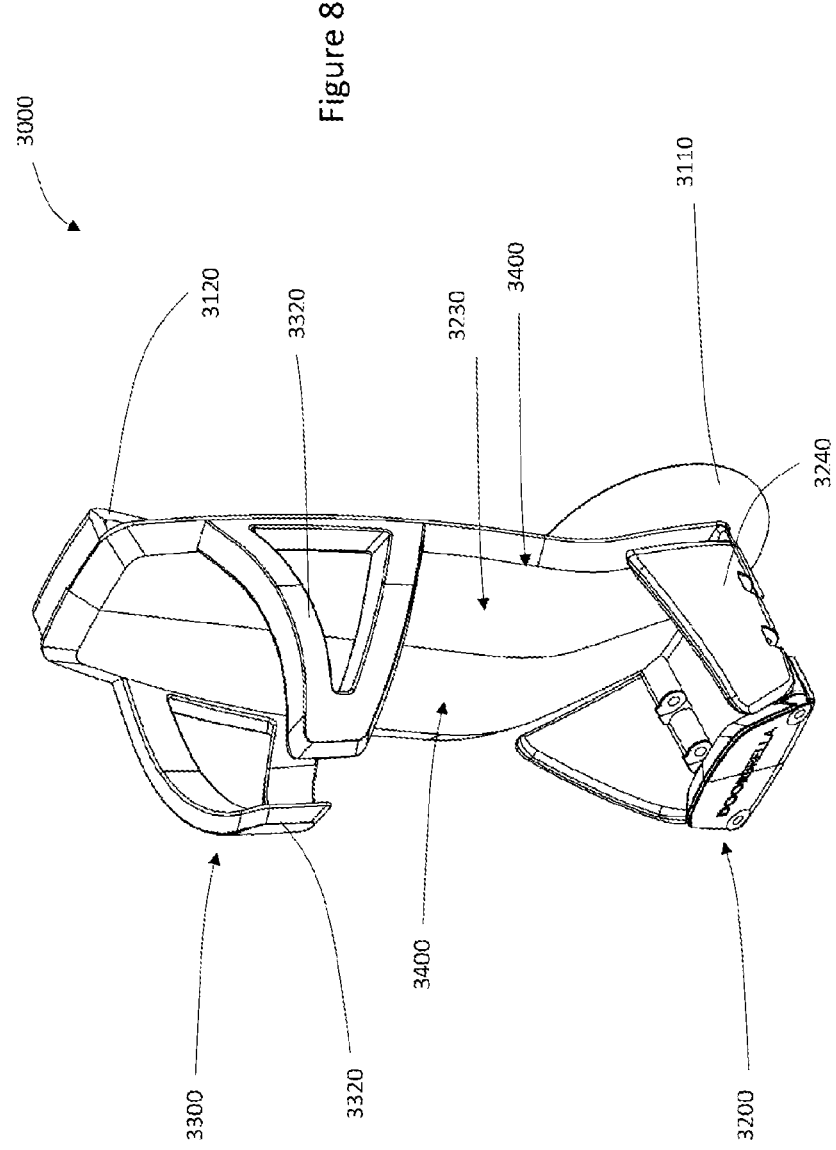
FIG. 8 shows a top front perspective view of a second embodiment of a holding arrangement.
Figure 12:
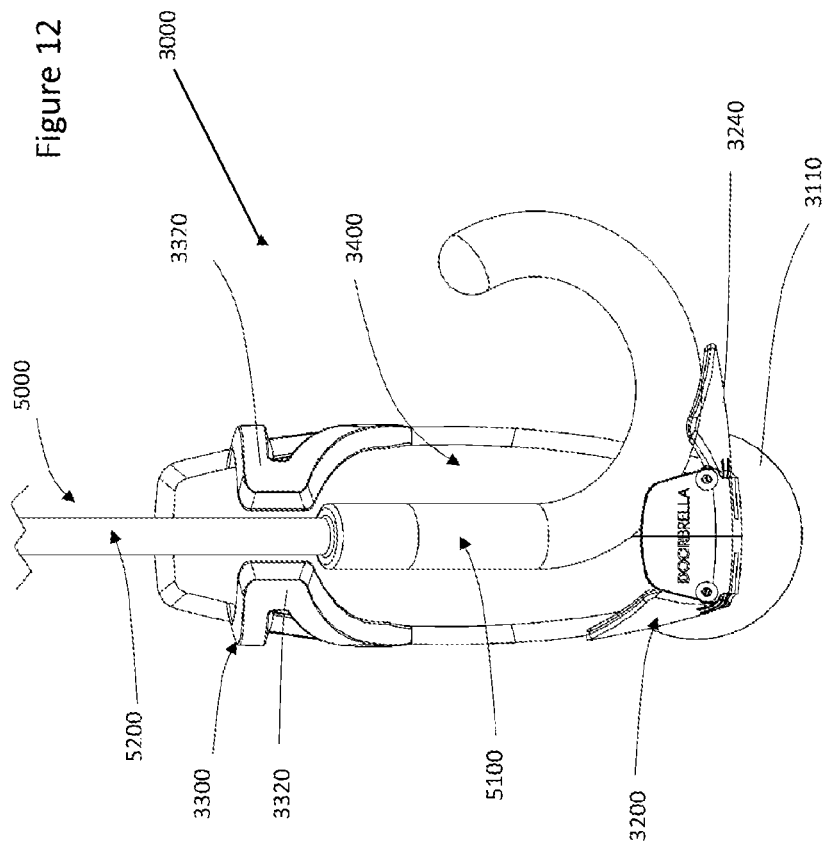
FIG. 12 shows a front view of a second embodiment of a holding arrangement and an umbrella being inserted.
Figure 11:
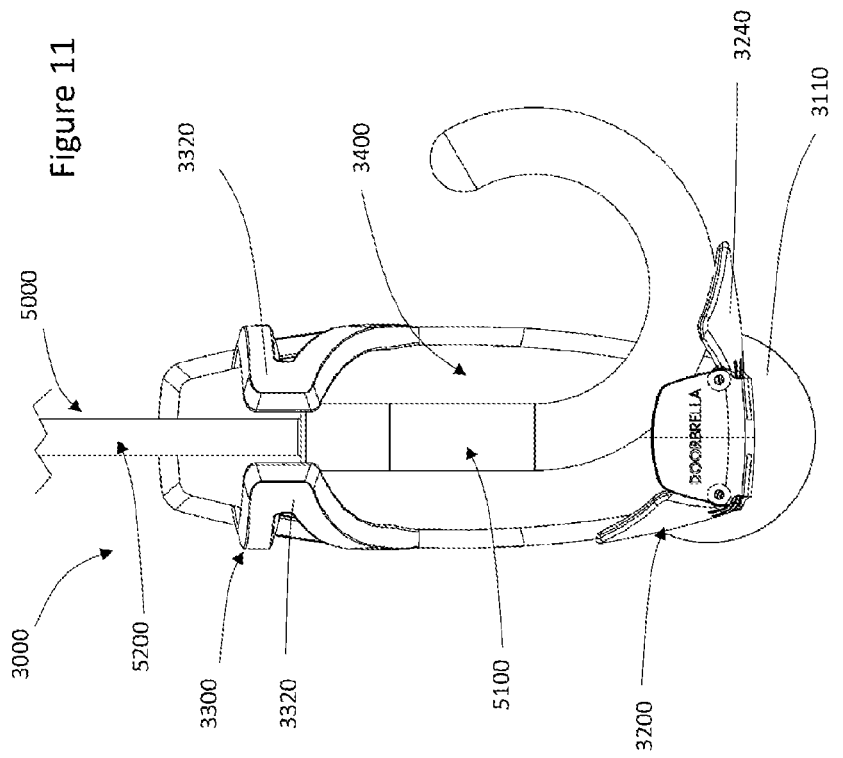
FIG. 11 shows a front view of a second embodiment of a holding arrangement holding an umbrella.
Figure 17:
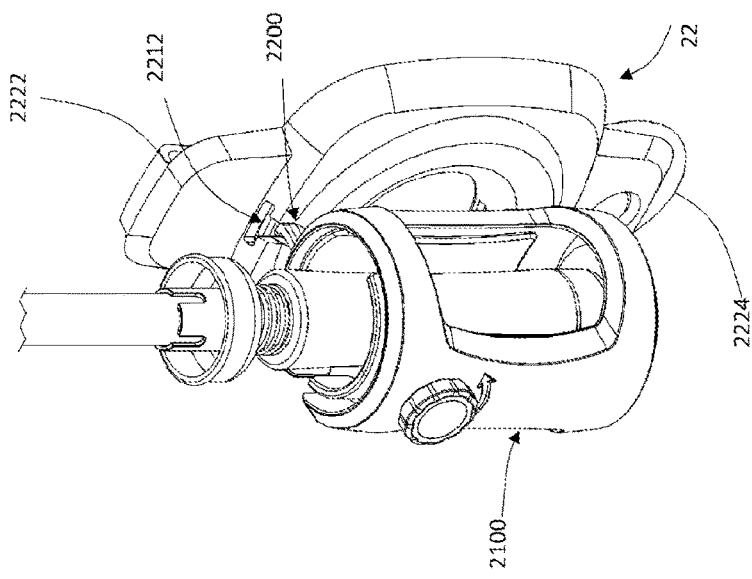
FIG. 17 shows a top front perspective view of a third embodiment of a holding arrangement showing a movable portion mounted in a mountable portion.
Figure 16:
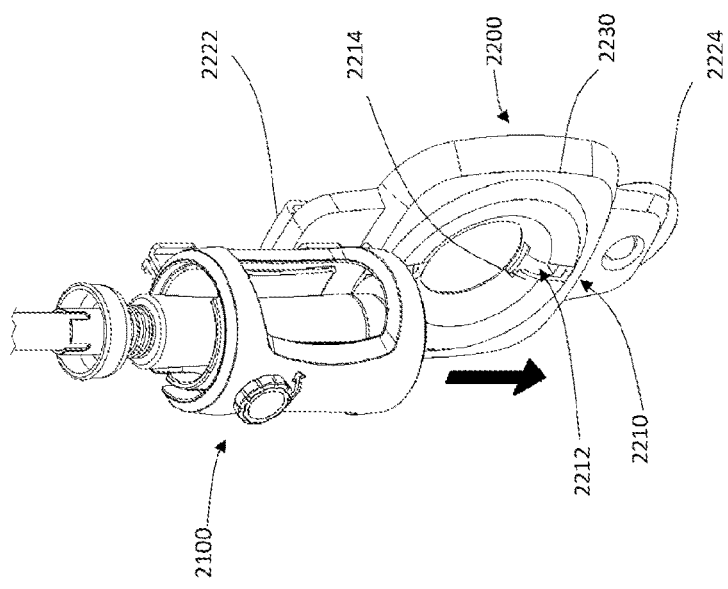
FIG. 16 shows a top front perspective view of a third embodiment of a holding arrangement showing a movable portion being mounted to a mountable portion.
Figure 15:
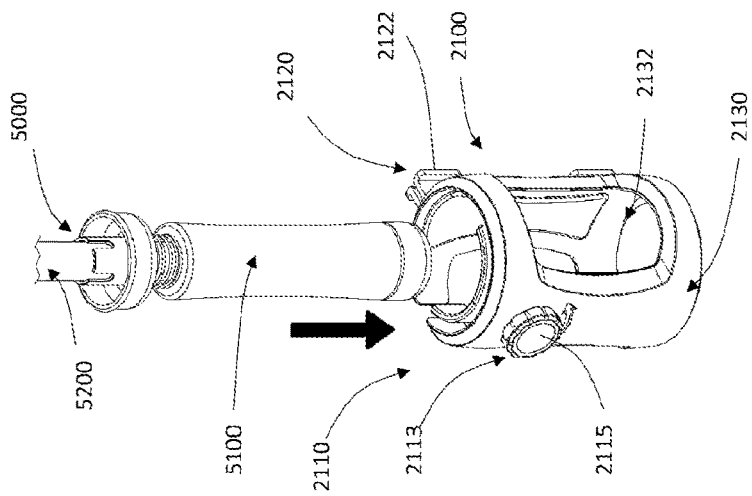
FIG. 15 shows a top front perspective view of a movable portion of a third embodiment of a holding arrangement and an umbrella being inserted.

Referring to FIG. 5 there is shown the operation of the protective cover which begins in the storage mode 110. The activation means 132 continually checks for and receives and assesses initiation signals from one or more detectors 135, 136.

These detectors in one form can be for detecting the external elements. This can be a rain sensor on an extremity of the vehicle or a sunlight intensity detector or heat detector which could be activation initiation elements to provide a sunshade or heat shade rather than just a rain cover.

These detectors in another form are a vehicle status detector. Therefore the detector could be a motion sensor that senses when the vehicle has come to a complete stop and or when the hand brake is initiated so that this detection is likely to coincide with the expected time for dismounting from the vehicle.

These detectors in another form are a passenger or driver initiation detector. That is the passenger or vehicle can initiate a signal which identifies that the person is about to dismount from the vehicle. Such passenger or driver initiation can be due to the hand brake or due to the door handle being operated or a specific add on detector so that the passenger or driver can selectively operate or override the predefined operation of the activation means.

The activation means 132 after its receipt and assessment of detected initiation signals can provide an initiation to the activation mechanism, which when activated, enables the cover to proceed from the storage position in the storage mode 110 to the covering position in the protective mode 115.

The activation mechanism 131 can automatically continue operation to the extension mode 120 in which the covering area 14 extends over the normal covering area 14A between a vehicle door 12 and the vehicle 13 to an extended covering position in which the cover area includes expansion area 14B that is beyond the normal covering area 14A and thereby provides further coverage. However preferably the activation means 132 can also receive and assess selective initiation signals to provide initiation of activation mechanism to enable the cover to proceed from the normal covering position to the extended covering position.

The activation means 132 can also act as a retraction means 133 which receives and assesses retraction signals from detectors 137, 138 to provide initiation of activation mechanism 131 to enable the cover to proceed from the covering position to the storage position. Clearly the activation mechanism could first retract the cover means from the extension mode 120 to the protective mode 115 or this could occur in single operation.

The retraction means 133 can receive and assesses retraction signals of one or more of the detection of external elements, a vehicle status detector, or a passenger or driver initiation detector. There can be a combination of detections. Therefore if the door is closed this could imitate the activation means to retract the cover means from the extension mode 120 to the protective mode 115. However the driver could selectively operate the retraction.

Thereby the protective cover for extending to a covering position relative a vehicle to allow a driver or passenger to be protected from the external elements when alighting or boarding the vehicle from the passenger or the driver vehicle doorway.

Removably Attachable Modular Holding Arrangement

A holding arrangement according to a further aspect of the invention is shown in FIGS. 15-25 as reference numeral 2000. The holding arrangement 2000 is suitable for holding an umbrella in a position to protect a user during ingress or egress of a vehicle 11.

The holding arrangement 2000 comprises a movable portion 2100 and a mountable portion 2200.

The movable portion 2100 is intended for attachment or mounting to an umbrella 5000, either at the umbrella's handle 5100, or its shaft 5200 (where suitable space is available for attachment). As shown in the figures, the movable portion 2100 includes a receiving formation 2130 configured for receiving a lower portion of the umbrella handle 5100, as well as a securing arrangement 2110 for securing the holding arrangement 2000 to the handle of an umbrella 5000.

In the embodiments shown in FIGS. 15-25, the receiving formation 2130 is configured as a cup for receiving and supporting the handle 5100 of the umbrella 5000. The securing arrangement 2110 includes a threaded fitting and/or clamping fitting in the form of a threaded screw member 2113 that extends through a threaded aperture (not shown) in the receiving formation 2130. The threaded screw member 2113 includes a manually manipulatable head 2115 that can be turned by a user to thereby secure the umbrella handle 5100 within the receiving formation 2130 by clamping.

It is envisaged that the receiving formation can include one or more selected from an aperture 2132 or a recess for accommodating at least part of an umbrella handle.

The movable portion 2100 further comprises engaging formations 2120 configured to engage with complementary engaging formations 2210 on the mountable portion 2200. The engaging formations 2120 (shown in FIG. 24) comprises sliding lug formations 2122 that are T-shaped in cross-section. The lug formations 2122 are receivable within complementary engaging formations 2210 on the mountable portion 2200 in the form of a slot 2212. The slot 2212 includes a restricted neck formation 2214 to allow sliding movement of the lug formations 2122 along the length of the slot 2212, but prevents removal of the lug formations 2122 from the slot 2212 in a direction transverse to the length of the slot.

It is envisaged that in use, the lug formations 2122 will be slidingly engaged downwardly within the slot 2212 until the lug formation 2122 is abutted against a stopper formation (not shown).

The mountable portion 2200 is configured to be securable to any one or more of a vehicle door, a stroller, a handle formation, or to any other item to which an umbrella is required to be attached. To this extent, the mountable portion 2200 comprises a mounting arrangement 2220 that is configured and/or adapted for mounting the mountable portion to such vehicle door, stroller, handle formation, or any other item. The embodiments shown in the figures are specifically configured for attachment to a stroller 6000 or pram, and to the window 17 of a vehicle door 12, although it will be appreciated that a wide variety of other suitable configurations are possible.

The mountable portion 2200 preferably comprises a body 2230, on which the complementary engaging formations 2210 and the mounting arrangement 2220 are mounted.

Figure 20:
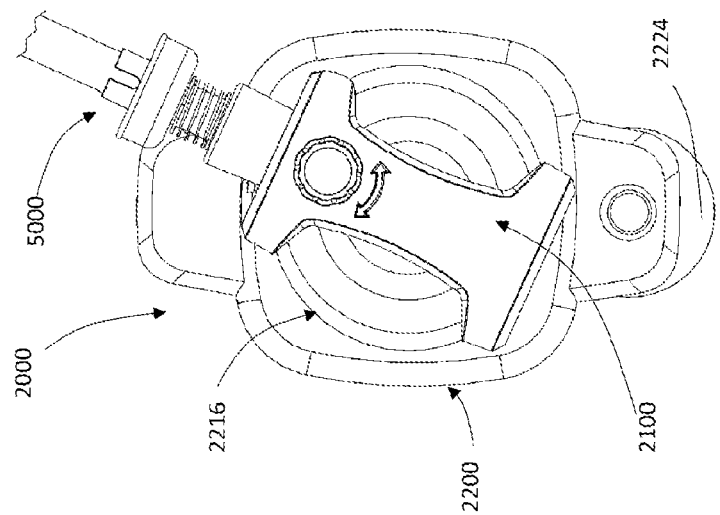
FIG. 20 shows a front view of a third embodiment of a holding arrangement holding an umbrella.
Figure 19:
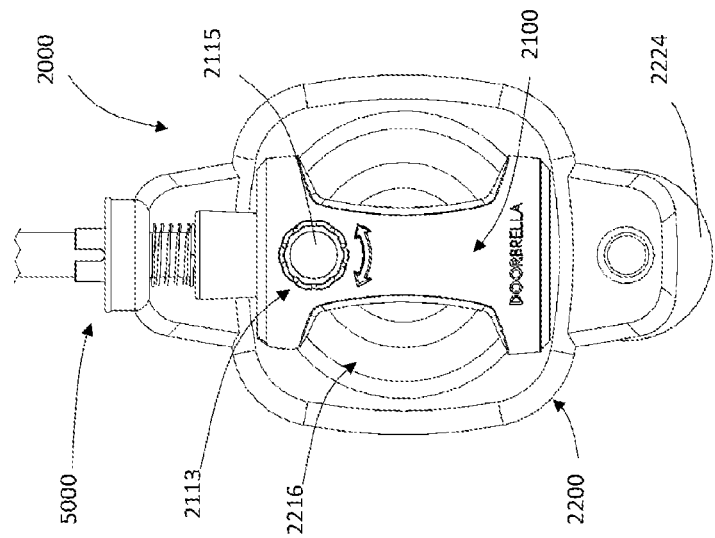
FIG. 19 shows a front view of a third embodiment of a holding arrangement holding an umbrella.
Figure 18:
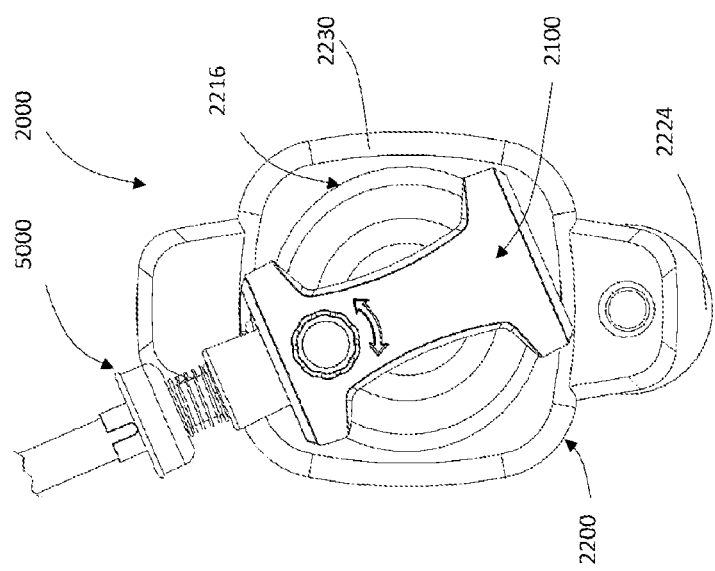
FIG. 18 shows a front view of a third embodiment of a holding arrangement holding an umbrella.
Figure 23:
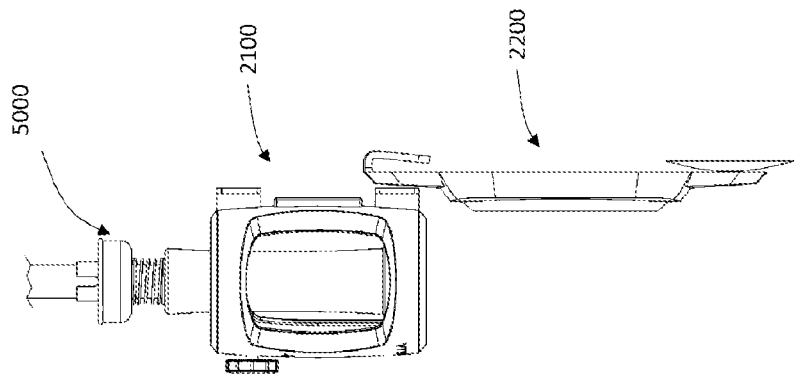
FIG. 23 shows a front view of a third embodiment of a holding arrangement showing a movable portion mounted in a mountable portion.
Figure 22:
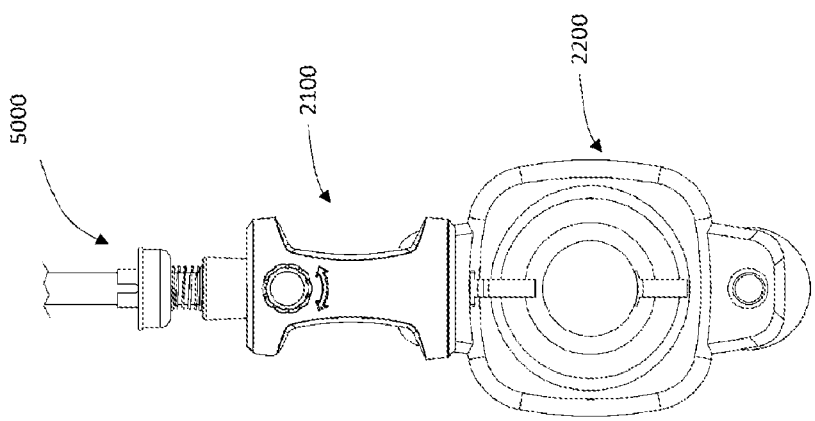
FIG. 22 shows a front view of a third embodiment of a holding arrangement showing a movable portion being mounted to a mountable portion.
Figure 21:
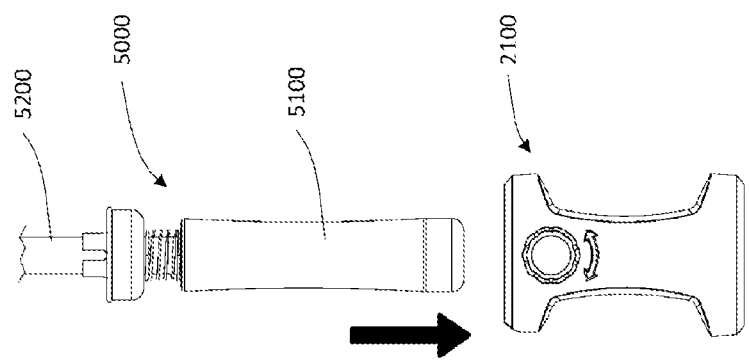
FIG. 21 shows a front view of an umbrella being received into a movable portion of a third embodiment of a holding arrangement.

In the embodiments shown in FIGS. 15-23, the complementary engaging formations 2210 are mounted on a rotating bezel portion 2216 that allows for pivoting movement of the movable portion 2100 relative to the mountable portion 2200. FIGS. 18-20 show the rotating bezel portion 2216 rotated through different degrees of rotation. In this way, an umbrella, once mounted to a vehicle, a stroller, et cetera, can be pivoted to provide more effective protection against the elements (including sun and rain). It is anticipated that a rotating bezel portion could alternatively be provided on the movable portion for providing the same function.

Further, in this way, the movable portion 2100 may be quickly and conveniently removed from engagement with a mountable portion 2200 that is secured to a vehicle, for example, and engaged with another mountable portion 2200 that is secured to a stroller 6000.

Figure 24:
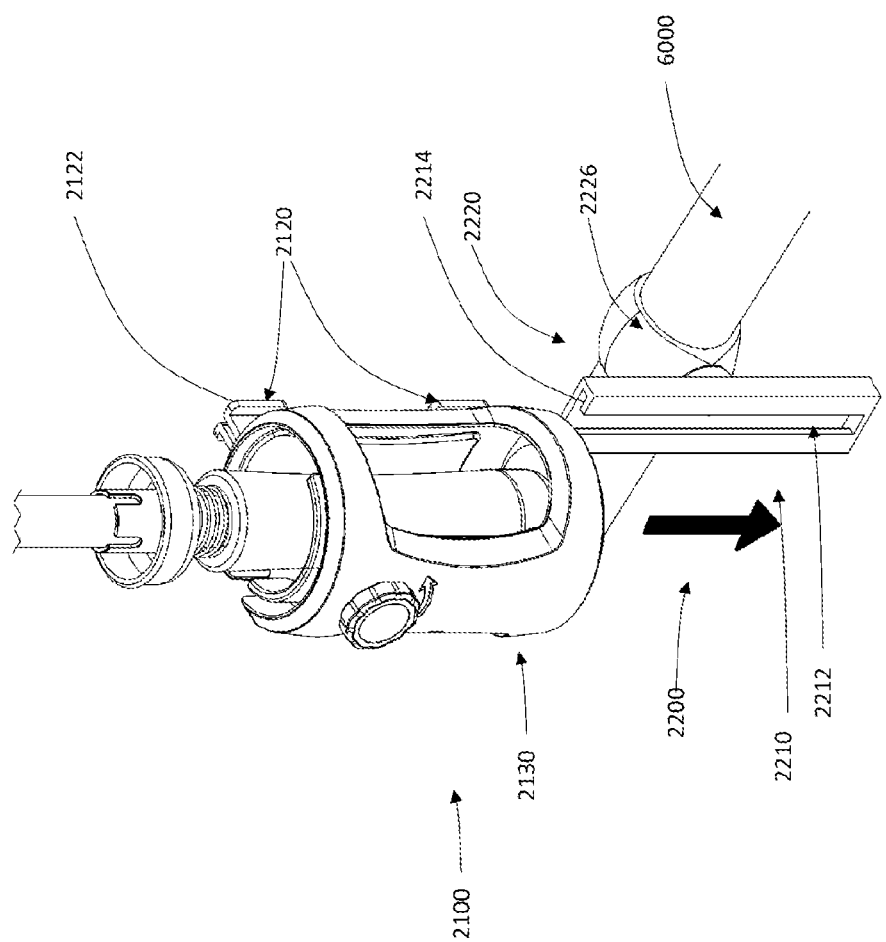
FIG. 24 shows a top front perspective view of a fourth embodiment of a holding arrangement holding an umbrella with the movable portion being mounted in a mountable portion.
Figure 25:
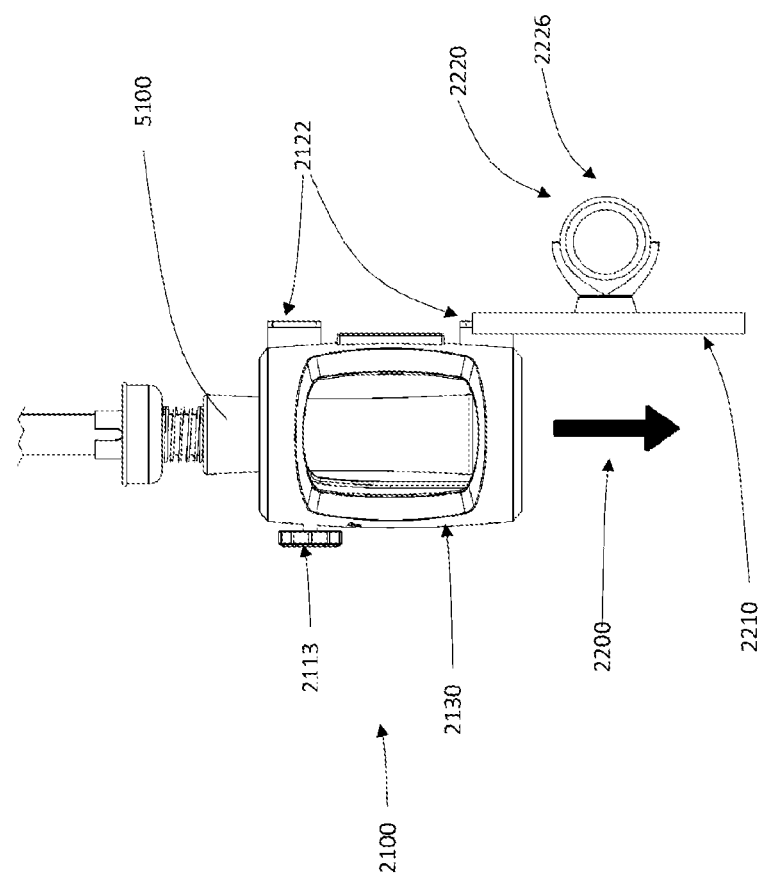
FIG. 25 shows a side view of FIG. 24.
Figure 26:
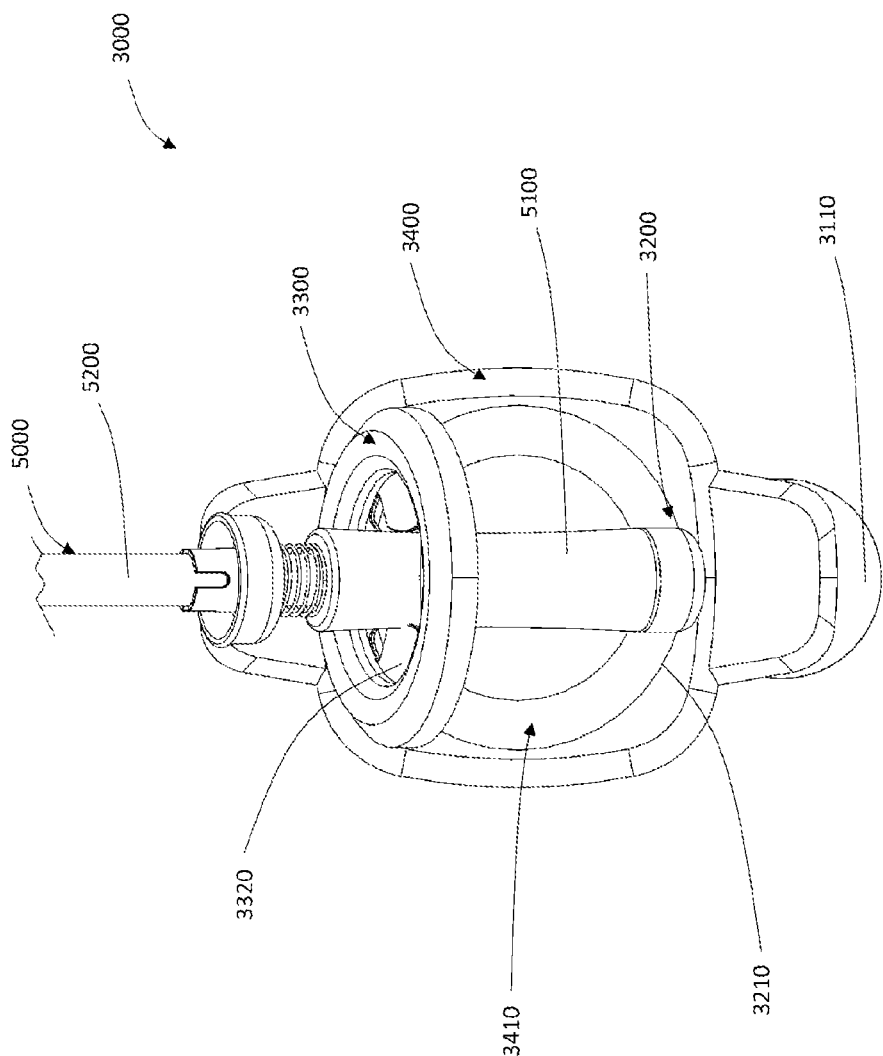
FIG. 26 shows a front view of a fifth embodiment of a holding arrangement holding an umbrella.
Figure 27:
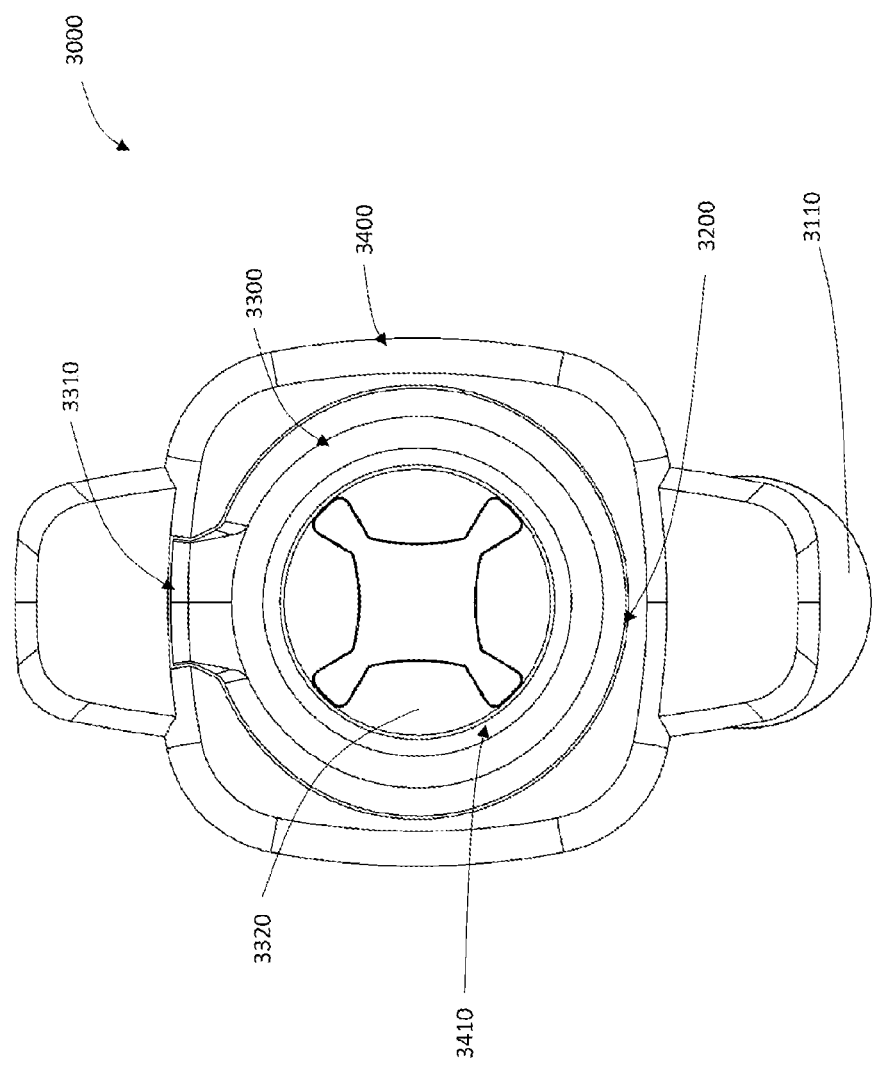
FIG. 27 shows a front view of a fifth embodiment of a holding arrangement with the lateral support formation in its stowed position.

As shown in FIG. 24, the mounting arrangement 2220 is mounted onto a stroller 6000 by means of a clamping fitting 2226. In one embodiment, the clamping fitting 2226 can be clamped onto a stroller or similar by turning a screw threaded formation (not shown), or any other suitable clamping arrangement.

Further, as shown in FIGS. 15-23, the mounting arrangement 2220 comprises a hook formation 2222 configured for hooking over the top edge of a vehicle window, and a sucker formation 2224 configured for sucking on to an inner surface of the vehicle window.

It will be appreciated that the embodiments shown illustrate only a few of a wide variety of fitting types that could be used for the securing arrangement 2110, engaging formations 2120, complementary engaging formations 2210 and mounting arrangement 2220 ("the components"). It is envisaged that any of these components could also include other fitting types, including:

a) a resilient snap fit-type fitting utilising a resiliently flexible formation that allows the clipping or snapping of one component to another, b) an elastic-type fitting utilising an elastically deformable formation that is stretched, and wherein the stretched elastically deformable formation holds a component in place, c) a threaded fitting utilising thread formations, for example such as screw type fastener, d) a sucker-type fitting utilising suction created by a sucker formation to hold a component in place, e) a spigot and socket-type fitting utilising a pair of complementary formations that fit into, and are received within each other, respectively, f) an interference fit-type fitting utilising close close tolerances to provide a tight friction fit to hold components in place relative to each other, g) a chemical bond-type fitting utilising chemical bonds within molecules to hold components in place relative to each other, h) a hook and loop-type fitting, for example as sold under the trade name Velcro®, to hold components in place relative to each other, i) a hook-type fitting utilising a hook formation for hooking one component on a suitably shaped complementary formation, and j) a bayonet-type fitting utilising at least one or more lines that are receivable within shaped slots to hold components in place relative to each other.

The engaging formations 2120 and the complementary engaging formations 2210 together comprise an engaging arrangement 2200. It is envisaged that the movable portion 2100 will be interchangeably and modularly engageable with different mountable portions 2200. In this way, an umbrella can be fitted with a modular movable portion 2100 that can be mounted to a wide variety of mountable portions 2200 by means of a modular engaging arrangement 2200 in the form of the engaging formations 2120 and the complementary engaging formations 2210.

A holding arrangement according to a further aspect of the invention is shown in FIGS. 6-14, 26-33, 36-40 as reference numeral 3000.

The holding arrangement 3000 is also for holding an umbrella, and comprises mounting formations 3100 configured for mounting the holding arrangement to a vehicle; a base support formation 3200 configured for supporting the handle of an umbrella; and a lateral support formation 3300 configured for engaging with and laterally supporting one or more selected from the shaft and the handle of an umbrella.

The mounting formations 3100, base support formation 3200 and lateral support formation 3300 are each preferably mounted to a body 3400. The lateral support formation 3300 is preferably pivotably mounted to the body 3400 by means of a pivoting formation 3310. In the embodiment shown in FIGS. 26-33 and 36-38 the pivoting formation 3310 is a living hinge or flap, although it will be appreciated that alternative pivoting formations, such as hinges (not shown) or the like can also be suitable.

The lateral support formation 3300 can be moved between a stowed position in which it is folded up in abutment with the body 3400, and a deployed position in which the lateral support formation operates to support an umbrella 5000. In the embodiment shown in FIGS. 26-33, the lateral support formation is received into a recess 3410 in the body 3400 when in its stowed position.

The lateral support formation 3300 shown in FIGS. 26-33 and 36-38 includes resiliently movable clipping members 3320 that are configured to deform elastically to be able to engage with and support umbrellas 5000 of varying thicknesses.

It is anticipated that in alternative embodiments (not shown) at least part of the base support formation 3200 can also be pivotably mounted to the body by means of pivoting formations (not shown) to move between a stowed position and a deployed position.

The mounting formations 3100 are shown in FIGS. 26-33 and 36-38 as being a sucker formation 3110 configured for sucking on to a glass vehicle window, and a hook formation 3120 configured for hooking over the top of a vehicle window. However, it is anticipated that the mounting formations could comprise a wide variety of alternative fitting types. Examples of such alternative fitting types not shown, but can include:
  a) a resilient snap fit-type fitting utilising a resiliently flexible formation that allows the clipping or snapping of the mounting formation to a vehicle door or vehicle body,
  b) an elastic-type fitting utilising an elastically deformable formation that is stretched, and wherein the stretched elastically deformable formation holds the mounting formation to a vehicle door or vehicle body,
  c) a threaded fitting utilising thread formations, for example such as screw type fastener for mounting the mounting formation to a vehicle door or vehicle body,
  d) a spigot and socket-type fitting utilising a pair of complementary formations that fit into, and are received within each other, respectively,
  e) an interference fit-type fitting utilising close tolerances to provide a tight friction fit to hold the mounting formation to a vehicle door or vehicle body,
  f) a chemical bond-type fitting utilising chemical bonds within molecules to hold components in place relative to each other,
  g) a hook and loop-type fitting, for example as sold under the trade name Velcro®, to hold components in place relative to each other,
  h) a hook-type fitting utilising a hook formation for hooking one component on a suitably shaped complementary formation, and
  i) a bayonet-type fitting utilising at least one or more lines that are receivable within shaped slots to hold components in place relative to each other.

Figure 33:
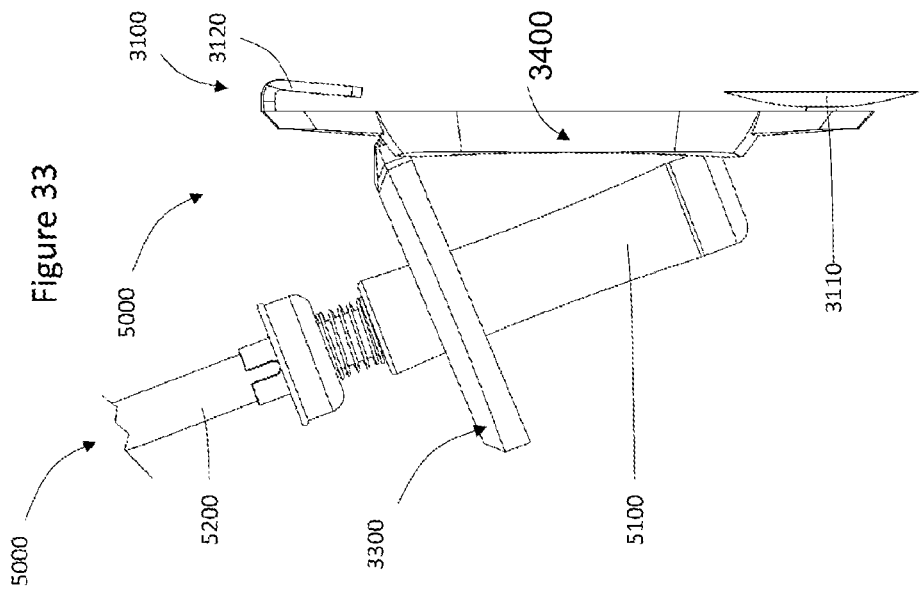
FIGS. 31-33 shows a side view of FIGS. 28-30.
Figure 32:
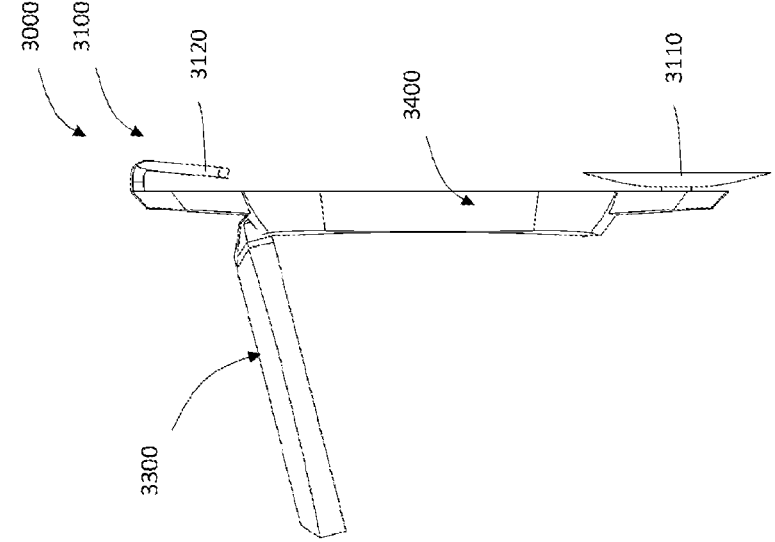
Figure 31:
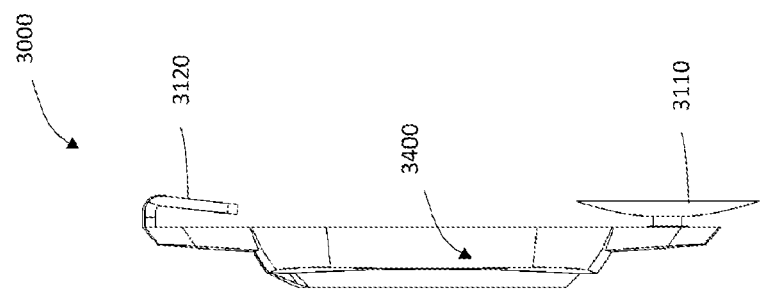

In the embodiment shown in FIGS. 26-33 and 36-38, the base support formation 3200 comprises a ridge formation 3210 with which the base of an umbrella handle 5100 can be engaged to support the umbrella 5000, as shown in FIGS. 33 and 30. In the embodiments shown in FIG. 26-33, the ridge formation 3210 is formed by an annular recess 3410 in the body 3400, into which the lateral support formation 3300 is receivable when in its stowed position.

Figure 36:
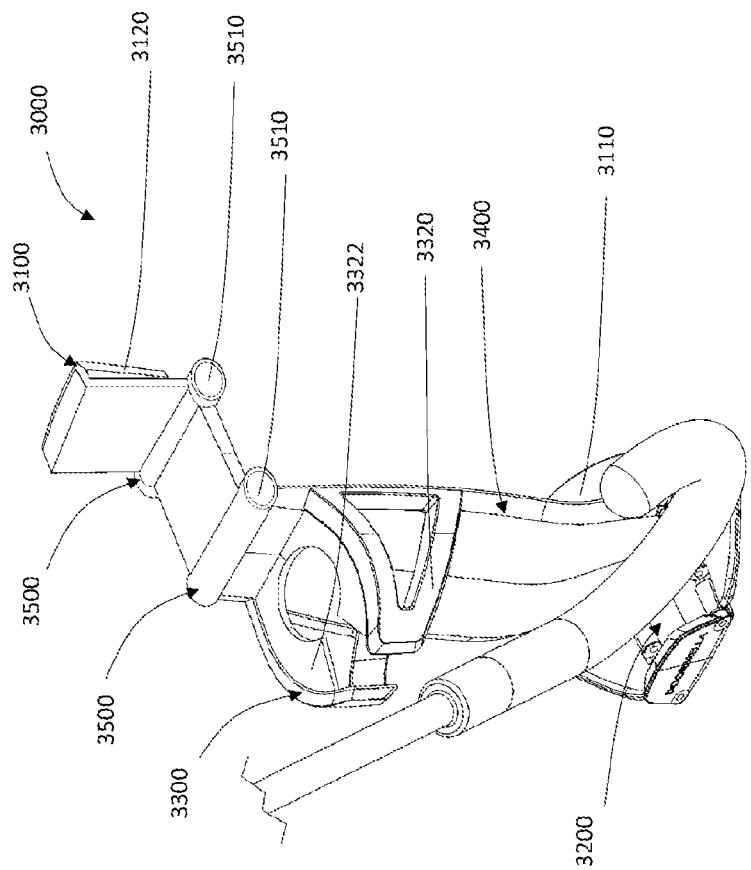
FIG. 36 shows a top perspective view of a sixth embodiment of a holding arrangement with an umbrella.
Figure 37:
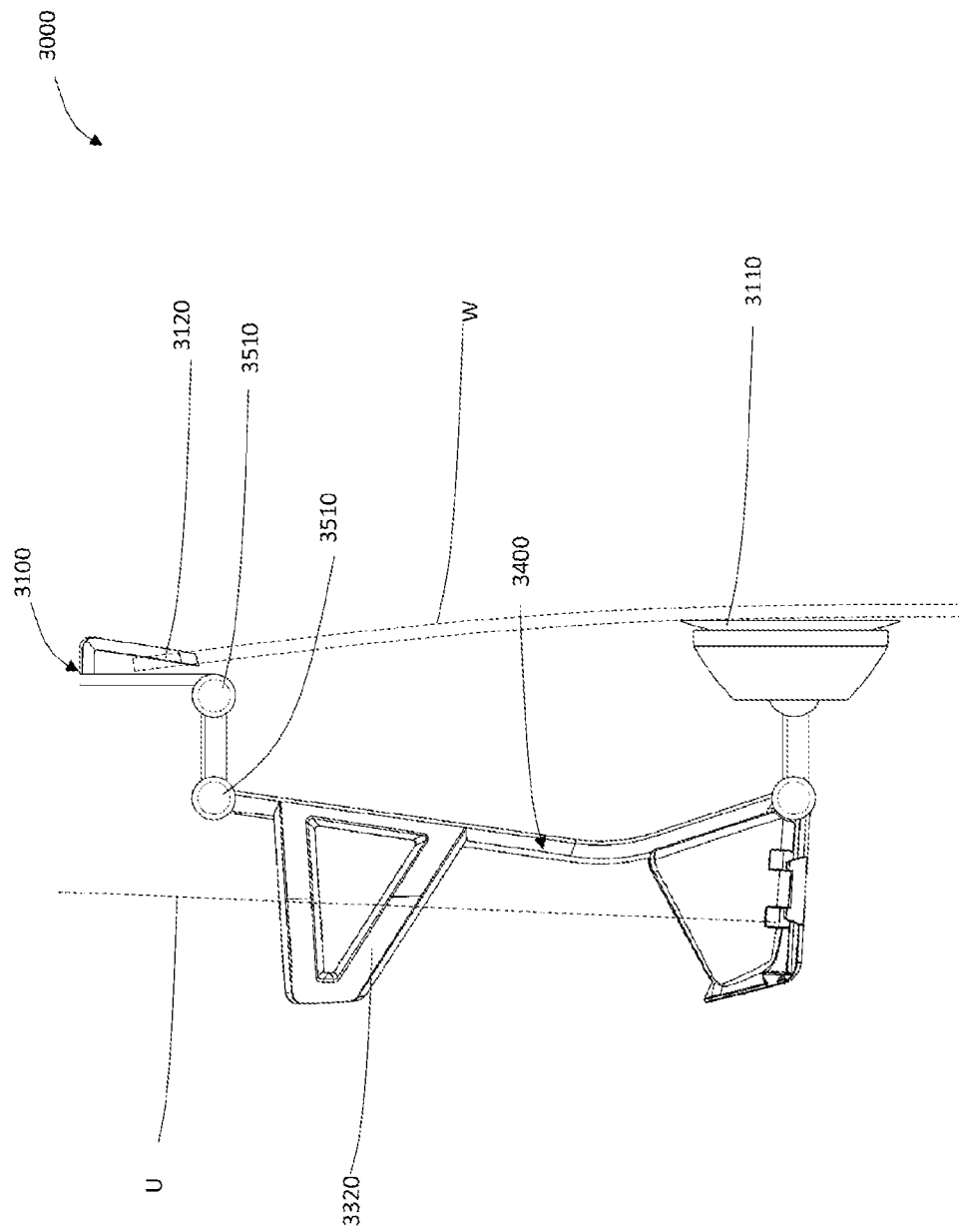
FIG. 37 shows a side view of a sixth embodiment of a holding arrangement.
Figure 38:
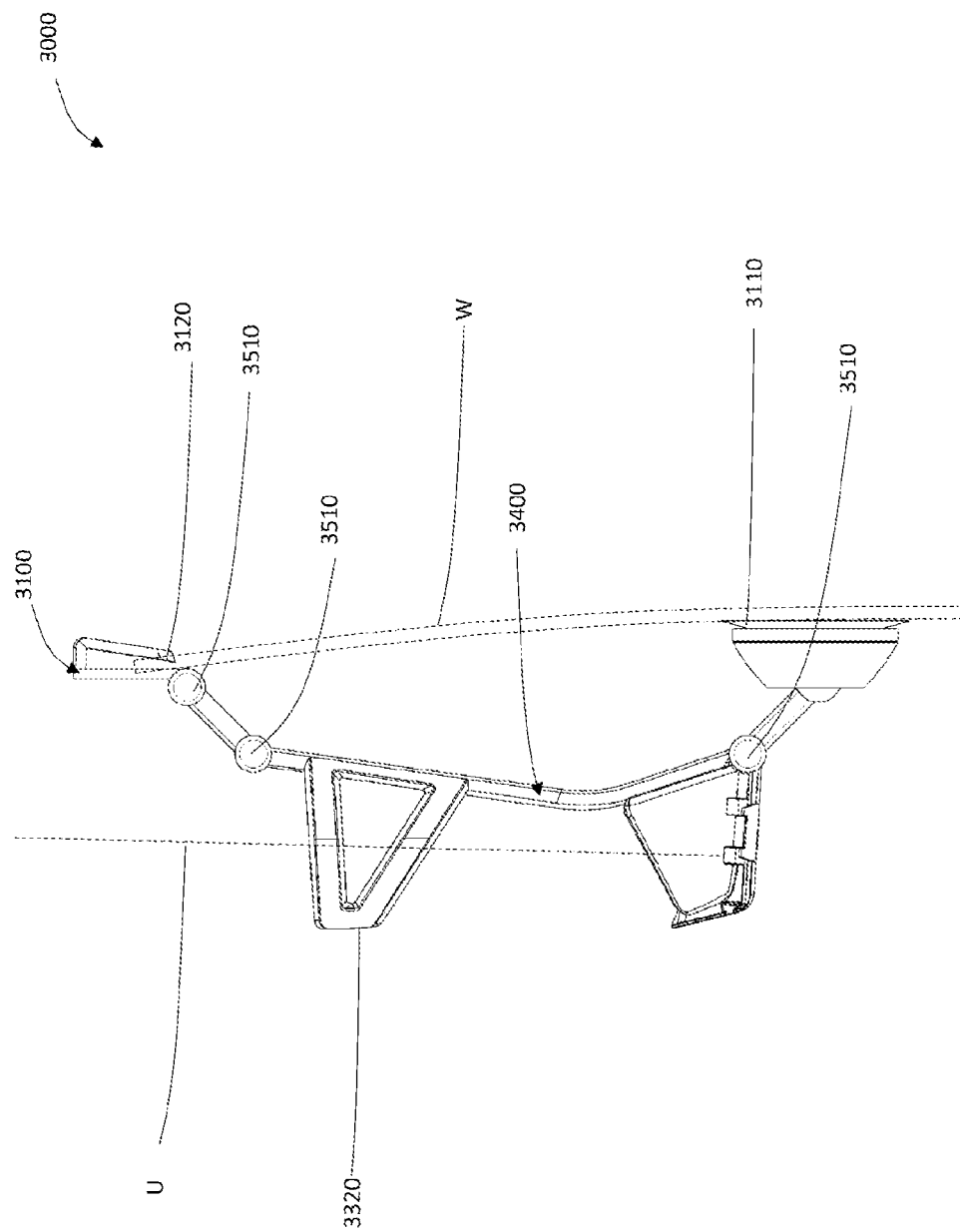
FIG. 38 shows a side view of a sixth embodiment of a holding arrangement.

In the embodiment shown in FIGS. 36-38, the holding arrangement 2000 further comprises an alignment adjustment arrangement 3500 in the form of a pair linkage members 3505, member 3505 being associated with pivoting hinges 3510.

Figure 44:
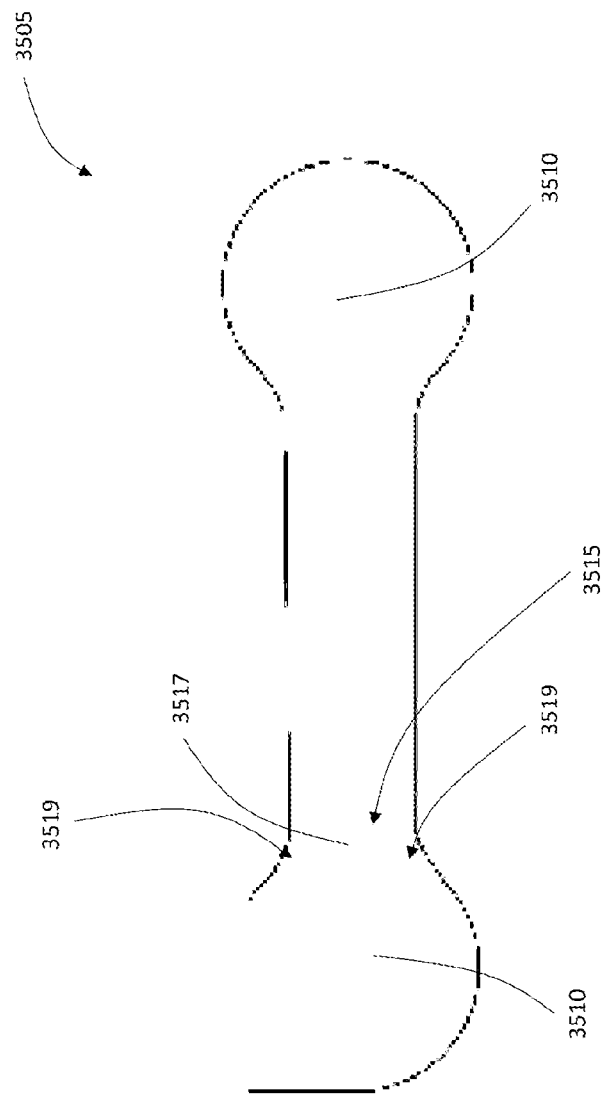
FIG. 44 shows a close-up view of a linkage member and its associated pivoting arrangements of FIG. 40.

As shown in FIG. 44, each linkage member 3505 includes an overcentre-type engagement arrangement 3515 whereby a protrusion 3517 is engageable with one of a plurality of recesses 3519 to fix the relative position of the pivoting hinges 3510.

In an alternative arrangement (not shown), the linkage members 3505 can be provided with a ratchet type arrangement (not shown) to allow pivotal movement in only one direction until the end of their range of movement is reached, and then movement to the beginning of their range of movement is made possible. The alignment adjustment arrangement 3500 is configured to allow the angle between the umbrella and the car door to be adjusted operationally to account for varying thicknesses in the car door frame, to thereby allow the umbrella to extend past the car door frame in operation. The adjustment arrangement 3500 is shown in two different positions in FIGS. 37 and 38, with the centre lines of the umbrella shaft shown as a broken line U, and the car window shown as a broken line W.

It will be appreciated by a person skilled in the art that a wide variety of alignment adjustment arrangements are possible, some examples of which include screw type adjustment formations, bayonet -type adjustment formations, or any other suitably engineered formations.

Further, in the embodiments shown in FIGS. 36-38, the resilient clipping members 3320 are configured to include a resiliently deformable flange 3322 that is deformed by insertion of the umbrella, and which returns to its original shape when the umbrella is removed. The resiliently deformable flange 3322 is preferably composed of a thin wall of resilient plastic material, and is preferably integral informed with the resilient clipping members 3320. The resiliently deformable flange 3322 assists in holding the umbrella snugly in operation to prevent it from rattling around in the lateral support formation 3300.

In the embodiment shown in FIGS. 6-14, the mounting formations 3100 also comprises a hook formation 3120 configured to hook over the top edge of a vehicle window 17 and a sucker formation 3110 adapted to stick or suck on to an inner surface of the vehicle window 17. However, the base support formation 3200 defines at least two tapered inner surfaces 3230 that together form a wedging formation 3220 into which the handle 5100 of an umbrella 5000 can be wedged, thereby to engage it securely. The base support formation 3200 further includes a pivoting member 3240 that is able to pivot downwardly about an axis 3242 to allow for a curved umbrella handle 5100 to be received into the wedging formation 3220.

Further, in the embodiment shown in FIGS. 6-14, the lateral support formations 3300 are rigidly integrally formed with the body 3400, and comprise resilient clipping members 3320 that are configured to elastically move apart from each other in operation as an umbrella is pushed between them, and to rebound to their initial positions once the umbrella 5000 has passed between them, to thereby act as a biasing arrangement and provide lateral support to the umbrella 5000. It will be appreciated that this function need not be used if the umbrella handle 5100 can be conveniently received by the resilient clipping members 3320 from the top (as shown in FIGS. 6 and 7). However, in the case where a curved umbrella handle 5100 is inserted (as shown in FIGS. 11-14), this may not always be possible.

Figure 39:
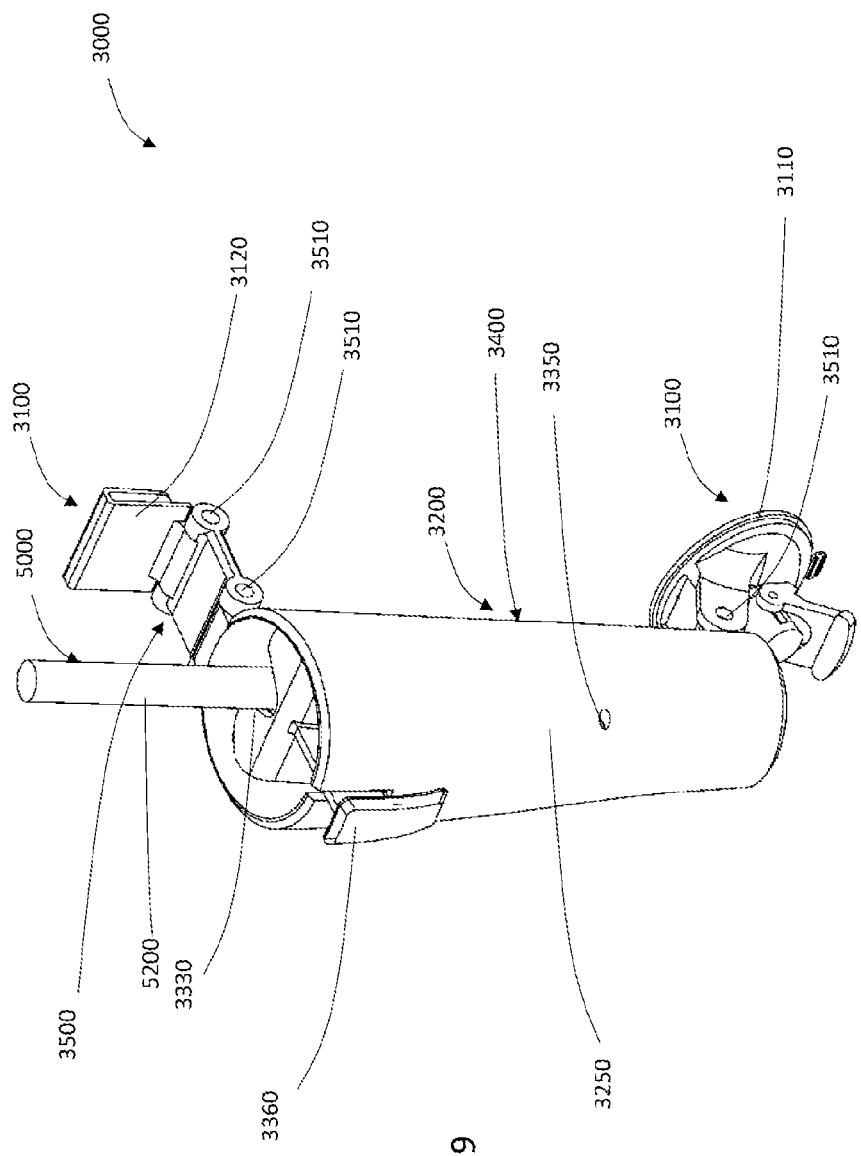
FIG. 39 shows a top perspective view of a seventh embodiment of a holding arrangement holding an umbrella.
Figure 40:
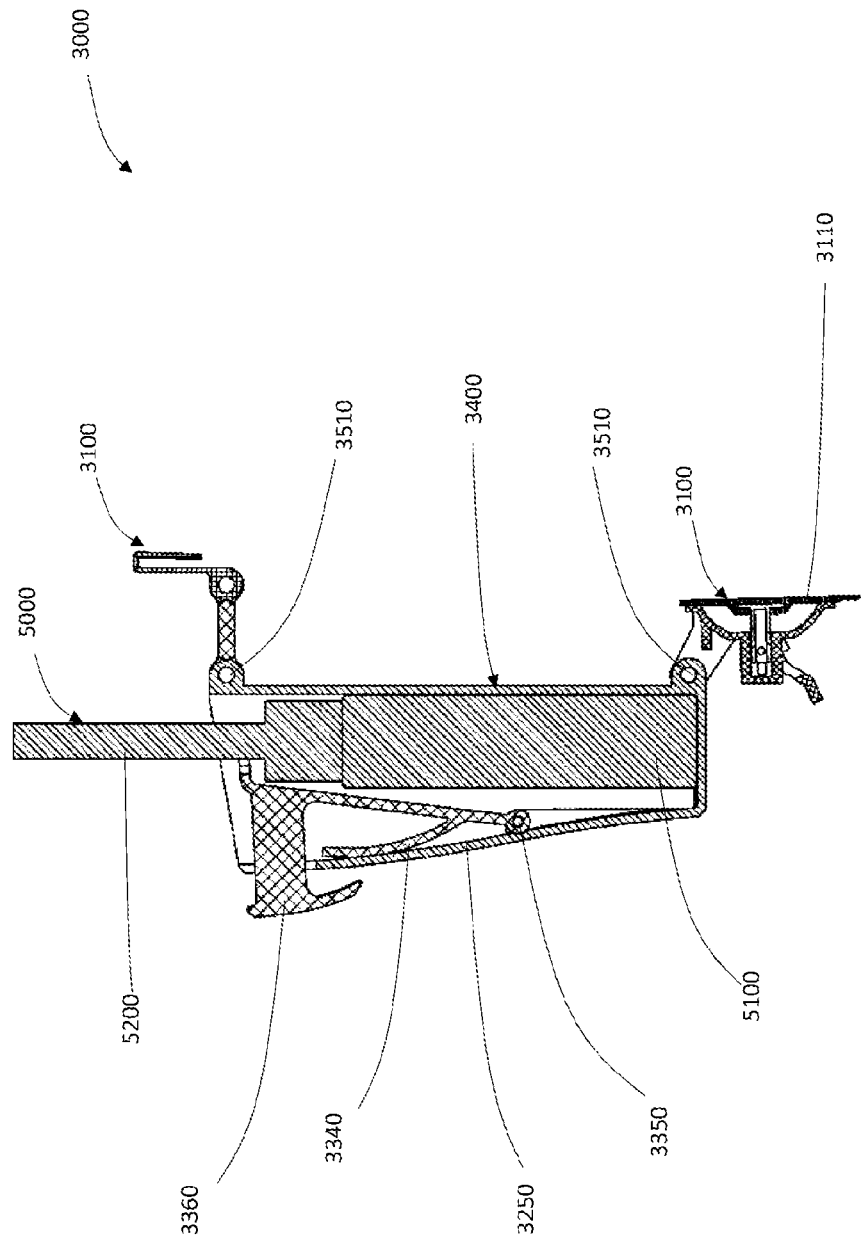
FIG. 40 shows a cross-sectional side view of a seventh embodiment of a holding arrangement holding an umbrella.

In the embodiments of a holding arrangement 3000 shown in FIGS. 39 and 40, the mounting formations 3100 are shown as hook formations 3120 and sucker formation 3110. The base support formation 3200 is integrally formed with the body 3400 and configured as a receptacle 3250 in which the handle of an umbrella is receivable.

The mounting formations 3100 are also pivotally connected to the body 3400 by means of an alignment adjustment arrangement 3500, including a pair of pivoting arrangements 3510 similar to those described above, so as to allow adjustment of the holding arrangement 3000 with respect to a vehicle's window, in order to account for variance in angles of vehicles windows as explained above.

In the embodiments shown in FIGS. 39 and 40, the lateral support formation 3300 is pivotally mounted to the receptacle at a hinge 3350. The lateral support formation further includes a biasing arrangement as will be described in more detail below. The lateral support formation 3300 is movable between an open position in which an umbrella is receivable into the base support formation operationally, and a holding position in which an umbrella is laterally supported.

Figure 41:
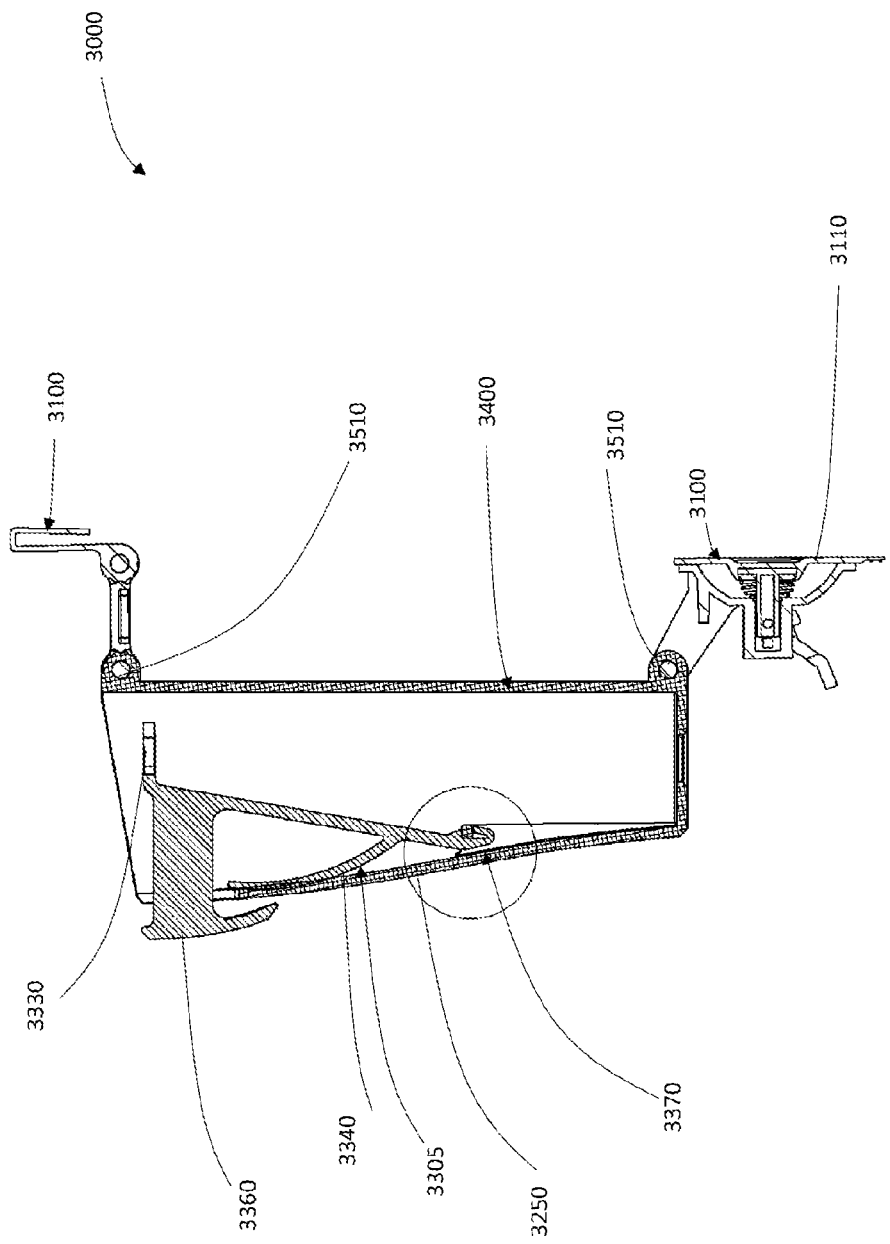
FIG. 41 shows a cross-sectional side view of an eighth embodiment of a holding arrangement.
Figure 42:
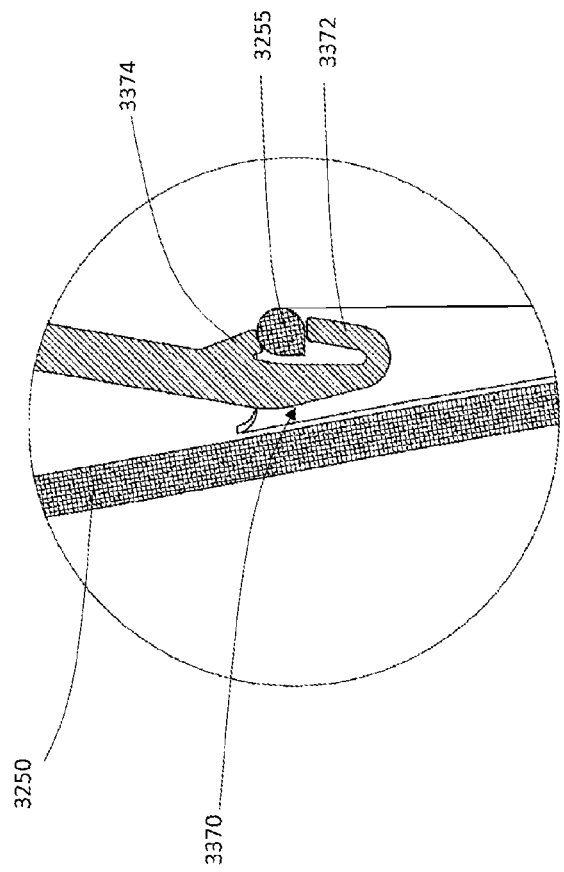
FIG. 42 shows a close-up view of the cross-sectional side view of an eighth embodiment of a holding arrangement shown in FIG. 41.
Figure 43:
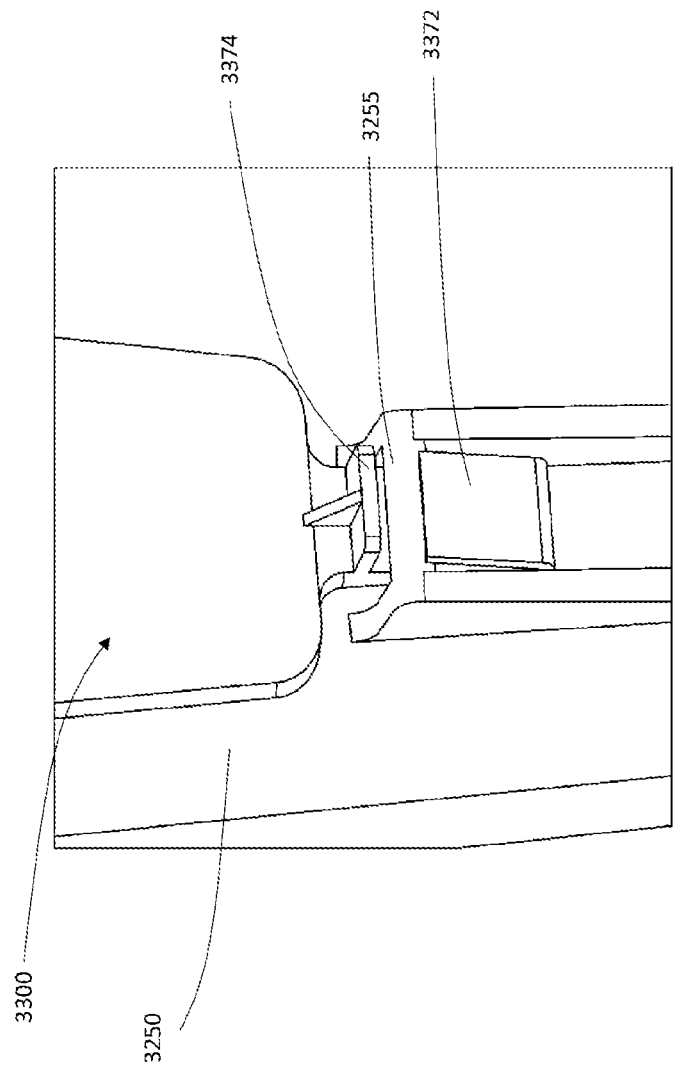
FIG. 43 shows a close-up perspective view of the inside of the receptacle showing the attachment of the lateral support formation to the receptacle.

In an alternative embodiment shown in FIGS. 41-43, the lateral support formation 3300 is pivotally mounted to the receptacle by means of a snap fit pivoting fitting 3370 that clips onto a lug 3255 on the receptacle in a pivoting fashion. The snap fit pivoting fitting 3370 comprises a backstop formation 3374 and barb formation 3372 that is resilient and configured to undergo elastic deformation when it is inserted into the space between the lug 3255 and an inner surface of the receptacle, and to snap back to its original shape once inserted past the lug 3255, preventing removal of the lateral support formation 3300 from the receptacle. The lug 3255 is held between the backstop formation 3374 and barb formation 3372, and the cross-section of the load 3255 is configured to prevent removal of the barb formations 3372 from the gap between the load 3255 and the inside surface of the receptacle 3250.

In this way it the snap fit pivoting fitting 3370 allows for convenient assembly of the receptacle 3250 and prevents removal of the lateral support formation 3300 from the receptacle, while allowing for the pivotal movement of the lateral support formation 3300 about the lug 3255.

The lateral support formation 3300 preferably includes a blade portion 3340 that is preferably composed of a resilient material such as resilient plastic or spring steel, to thereby effectively act as a leaf spring to bias the lateral support formation 3300 towards its holding position. In this way, it acts as a biasing arrangement. In alternative embodiments, it is envisaged that alternative biasing arrangements may be utilised, for example helical coil springs, metal leaf springs, or the like. However, use of the lateral support formation 3300 to bias itself is preferred, as this will reduce assembly costs.

The lateral support formation 3300 comprises a tapered engaging formation 3330 at an upper end thereof, the tapered engaging formation 3330 being configured for engaging with preferably the shaft of an umbrella in operation when in its holding position.

The tapered engaging formation 3330 defines a V-shaped taper, which is able to engage with and laterally support shafts and handles of a variety of thicknesses.

Where the tapered engaging formation 3330 engages with the shaft of an umbrella in operation, it is envisaged that the tapered engaging formation 3330 will also act as a detent formation that prevents upward or substantially vertical movement of an umbrella in operation, for example to prevent the umbrella being pulled out of the receptacle, for example by wind. In alternative embodiments (not shown), it is envisaged that a separate detent formation may be provided.

Figure 45:
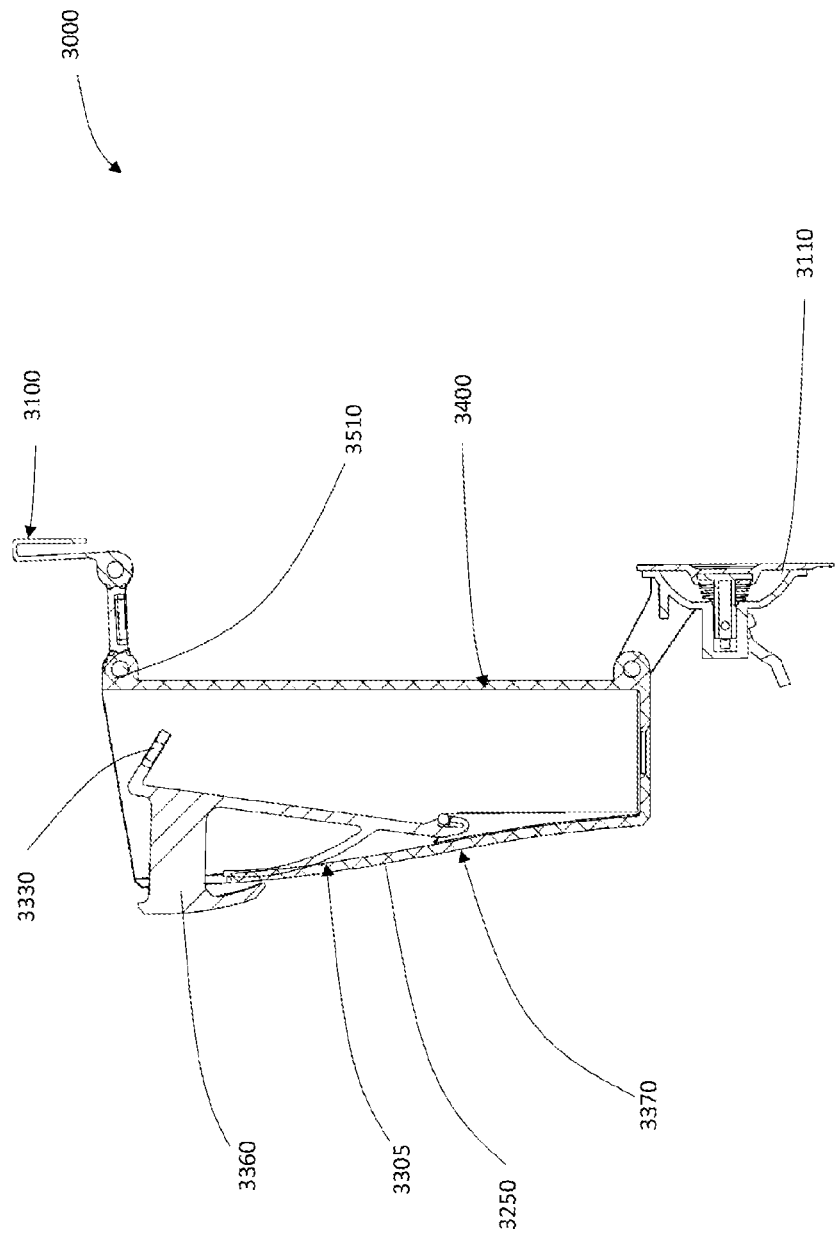
FIG. 45 shows a cross-sectional side view of a ninth embodiment of a holding arrangement.

In one preferred embodiment shown in FIG. 45, it is envisaged that the tapered engaging formation 3330 is also angled downwardly towards its distal or free end, so that force applied to an umbrella handle pushing on the top surface of the tapered engaging formation will have a sideways force component, thereby causing the tapered engaging formation to move against the bias of the biasing arrangement to allow the umbrella to be inserted. In this way, an umbrella can be inserted past the tapered engaging formation using only one hand, and preferably in a single movement.

The lateral support formation 3300 also includes a manual manipulation formation 3360 that is operable by a person's hand to move the lateral support formation 3300, and preferably to move the lateral support formation 3300 from its holding position to its open position.

In an alternative arrangement, it is envisaged that the base support formation 3200 need not be integrally formed with the body, and instead could be removably attachable to the body 3400 similarly to the holding arrangements as shown in FIGS. 15-25. Similarly, the mounting formations 3100 can be configured to be connectable to a wide variety of items such as a window, a stroller, et cetera.

Interpretation

EMBODIMENTS

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

For the purposes of this specification, the term "plastic", "elastomer" and elastomeric" shall be construed to mean a general term for a wide range of synthetic or semisynthetic polymerization products, and generally consisting of a hydrocarbon-based polymer.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to the vehicle accessory or vehicle industries.

The claims defining the invention are as follows:

1. A holding arrangement for holding an umbrella to a vehicle, the holding arrangement including:
   a body, open at its top for receiving at least a portion of the umbrella;
   at least two mounting formations, including an upper and a lower mounting formation, configured for mounting the holding arrangement to a vehicle, each said mounting formation attached to said body and separated from one another by a distance;
   a base support formation configured for upwardly supporting a handle of an umbrella; and
   a lateral support formation configured for engaging with and laterally supporting one or more selected from a shaft of the umbrella and the handle of the umbrella, the lateral support formation being movable between an open position in which the umbrella is receivable into the base support formation operationally, and a holding position in which the umbrella is laterally supported by the lateral support formation, the lateral support formation including:
   a tapered engaging formation configured for engaging with the umbrella in operation to move the lateral support formation to the open position, the tapered engaging formation angled downwardly towards a lower portion of the body; and
   a spring that bears against the body to bias the lateral support formation towards the holding position in operation to thereby laterally support the umbrella, such that, in use, a handle of the umbrella can serve initially to pivot the lateral support formation into the open position as the handle is being inserted into the body, with the lateral support formation being displaced by the spring into the holding position when the handle is in position in the body; wherein said upper mounting formation is attached to said body proximal to said body's top and includes a hook with an opening configured for sliding over a portion of a vehicle, said hook's distance from said body being adjustable; wherein said lower mounting formation includes a sucker which is arrangable to form a suction with a portion of a vehicle.

2. The holding arrangement as claimed in claim 1, wherein the body defines the base support formation in the form of a receptacle.

3. The holding arrangement as claimed in claim 1, wherein one or more selected from the base support formation and the lateral support formation is configured for pivotable engagement with the body.

4. The holding arrangement as claimed in claim 3, wherein the one or more selected from the base support formation and the lateral support formation comprise pivoting formations enabling pivotable engagement with the body.

5. The holding arrangement as claimed in claim 1, wherein, when the lateral support formation is the holding position, the lateral support formation prevents removal of an umbrella from the base support formation operationally.

6. The holding arrangement as claimed in claim 1, wherein the lateral support formation includes a detent formation configured for preventing vertical removal of the umbrella from the base support formation when the lateral support formation is in the holding position.

7. The holding arrangement as claimed in claim 6, wherein the detent formation is the tapered engaging formation.

8. The holding arrangement as claimed in claim 1, wherein the spring is a resilient blade portion.

9. The holding arrangement as claimed in claim 1, wherein said at least one mounting formation is pivotally connected to the body.

10. The holding arrangement as claimed in claim 1, wherein said at least one mounting formation is configured and adapted for allowing adjustable movement of the body relative to the vehicle in operation.

11. The holding arrangement as claimed in claim 1, wherein the holding arrangement includes an alignment adjustment arrangement configured for allowing angular adjustment of at least part of the holding arrangement relative to a vehicle.

12. The holding arrangement as claimed in claim 11, wherein the alignment adjustment arrangement comprises at least one pivoting arrangement allowing pivotal movement of the body relative to said at least one mounting formation.

13. The holding arrangement as claimed in claim 1, wherein the lateral support formation includes a manual manipulation formation configured for being manipulated by a user to move the lateral support formation between the holding position and the open position.

14. The holding arrangement as claimed in claim 13, wherein the manual manipulation formation includes a lever operably engaged with the tapered engaging formation, wherein, in use, the lever is movable in a slot in the body, the lever including a handle portion for engagement by the user, wherein the handle portion projects away from the body.

15. The holding arrangement as claimed in claim 1, wherein the lateral support formation is pivotably mounted to the body.

16. The holding arrangement of claim 1, wherein said tapered engaging formation includes at least a portion shaped as a V.

17. The holding arrangement of claim 11, wherein said alignment adjustment arrangement is configured within at least one of said upper and lower mounting formation.

18. The holding arrangement of claim 11, wherein at least one of said upper and lower mounting formation is attachable to a window of said vehicle.

* * * * *